United States Patent [19]
Niskanen et al.

[11] Patent Number: 5,154,425
[45] Date of Patent: Oct. 13, 1992

[54] COMPOSITE GOLF CLUB HEAD

[75] Inventors: Paul W. Niskanen, Newark, Del.; Danny R. White, Elkton; Mark G. Mortensen, North East; Stanislav Antolin, Elkton, all of Md.

[73] Assignee: Lanxide Technology Company, LP, Newark, Del.

[21] Appl. No.: 820,018

[22] Filed: Jan. 13, 1992

Related U.S. Application Data

[63] Continuation of Ser. No. 600,421, Oct. 19, 1990, abandoned.

[51] Int. Cl.$^5$ .............................................. A63B 53/04
[52] U.S. Cl. ............................... 273/167 J; 273/173
[58] Field of Search ............................ 273/173, 167 J

[56] References Cited

U.S. PATENT DOCUMENTS

| | | | |
|---|---|---|---|
| 1,592,463 | 7/1926 | Marker | 273/173 |
| 2,686,056 | 8/1954 | Oquist | 273/173 |
| 2,908,502 | 10/1959 | Bradstreet | 273/167 J |
| 3,218,072 | 11/1965 | Burr | 273/173 X |
| 4,076,254 | 2/1978 | Nygren | 273/173 |
| 4,199,144 | 4/1980 | Skelly | 273/173 X |
| 4,204,684 | 5/1980 | Molitor | 273/167 |
| 4,465,221 | 8/1984 | Schmidt | 273/173 X |
| 4,555,115 | 11/1985 | You | 273/167 |
| 4,618,149 | 10/1986 | Maxel | 273/79 |
| 4,630,826 | 12/1986 | Nishigaki et al. | 273/167 |
| 4,681,321 | 7/1987 | Chen et al. | 273/167 |
| 4,681,322 | 7/1987 | Straza | 273/173 |
| 4,687,205 | 8/1987 | Tominaga et al. | 273/169 |
| 4,713,360 | 12/1987 | Newkirk et al. | 501/87 |
| 4,740,345 | 4/1988 | Nagasaki et al. | 264/257 |
| 4,768,787 | 9/1988 | Shira | 273/175 |
| 4,793,616 | 12/1988 | Fernandez | 273/167 |
| 4,808,558 | 2/1989 | Park et al. | 501/80 |
| 4,818,734 | 4/1989 | Kantner et al. | 501/128 |
| 4,828,008 | 5/1989 | White et al. | 164/66.1 |
| 4,828,785 | 5/1989 | Newkirk et al. | 264/59 |
| 4,851,375 | 7/1989 | Newkirk et al. | 501/88 |
| 4,853,352 | 8/1989 | Newkirk et al. | 501/88 |
| 4,859,640 | 8/1989 | Newkirk | 501/128 |
| 4,871,008 | 10/1989 | Dwivedi et al. | 164/6 |
| 4,883,275 | 11/1989 | Boone | 273/172 |
| 4,885,130 | 12/1989 | Claar et al. | 419/12 |
| 4,900,699 | 2/1990 | Newkirk et al. | 501/94 |
| 4,915,736 | 4/1990 | Claar et al. | 75/238 |
| 4,916,113 | 4/1990 | Newkirk et al. | 501/89 |
| 4,918,034 | 4/1990 | Weinstein et al. | 501/87 |
| 4,923,832 | 5/1990 | Newkirk et al. | 501/128 |
| 4,935,055 | 6/1990 | Aghajanian et al. | 164/66.1 |
| 5,017,526 | 5/1991 | Newkirk et al. | 501/89 |
| 5,017,533 | 5/1991 | Newkirk et al. | 501/127 |
| 5,040,588 | 8/1991 | Newkirk et al. | 164/97 |
| 5,040,588 | 8/1991 | Newkirk et al. | 164/97 |
| 5,051,382 | 9/1991 | Newkirk et al. | 501/87 |

*Primary Examiner*—William H. Grieb
*Attorney, Agent, or Firm*—Mark G. Mortenson; Stanislav Antolin

[57] ABSTRACT

The present invention relates to golf clubs and particularly the invention relates to improved golf club heads which utilize composite materials in at least a portion therein. Potentially acceptable composite materials include: metal matrix composite and/or ceramic matrix composite materials. The use of metal matrix or ceramic matrix composite materials in golf club heads result in improved clubs.

29 Claims, 3 Drawing Sheets

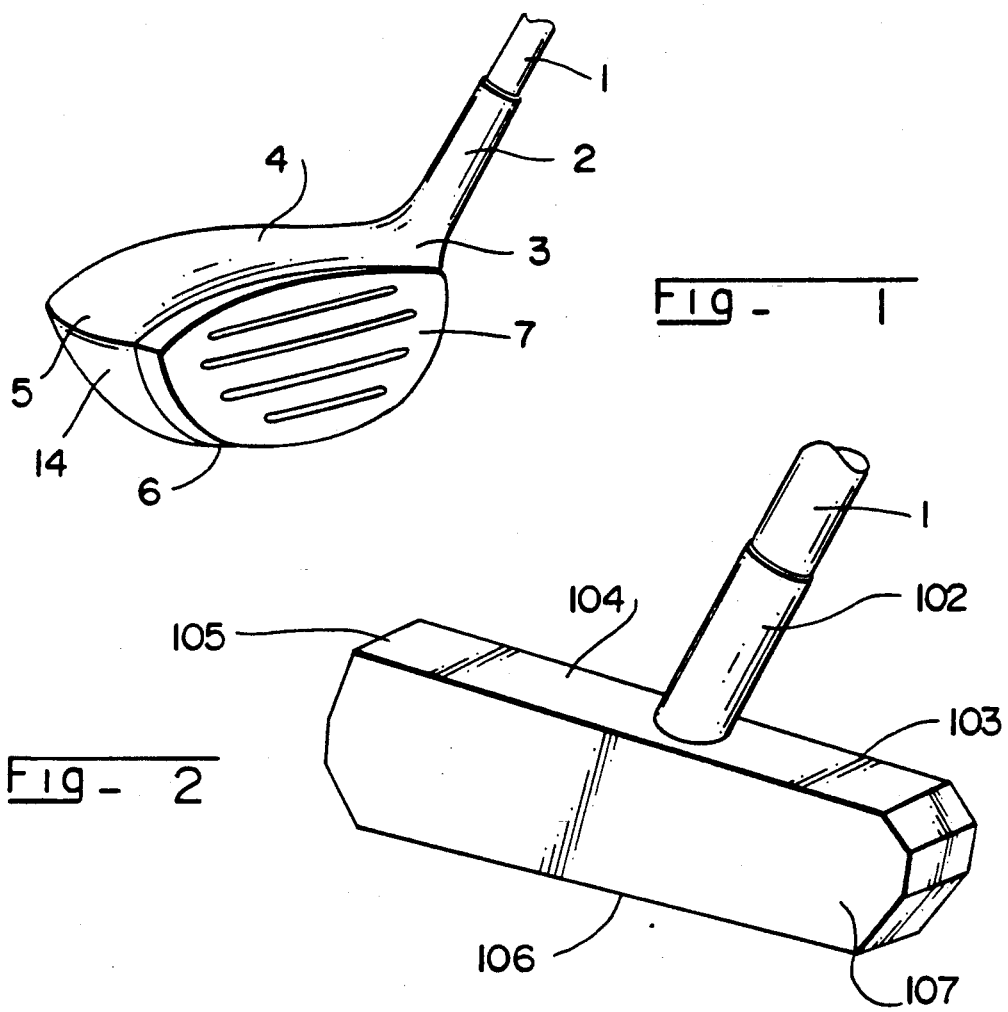
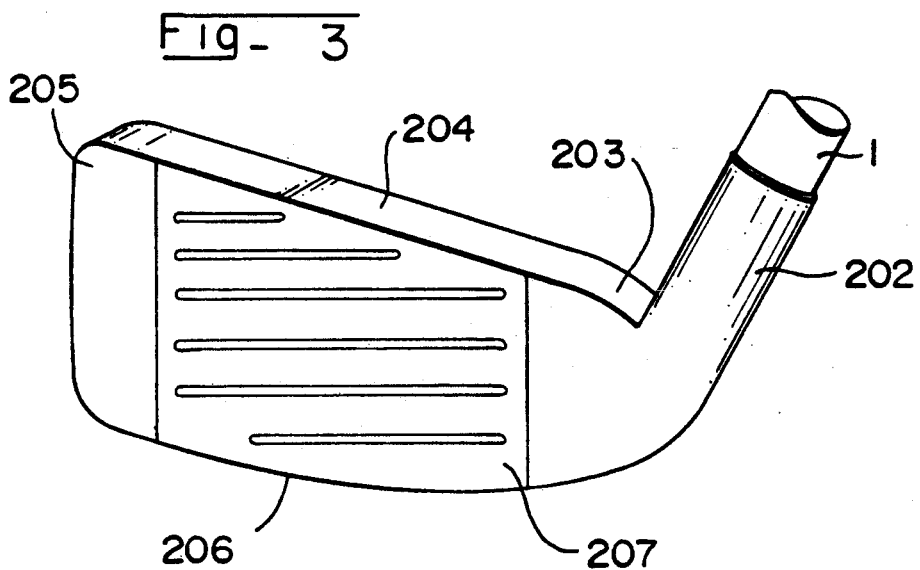

COMPOSITE GOLF CLUB HEAD this is a continuation of copending application Ser. No. 07/600,421 filed on Oct. 19, 1990, now abandoned.

FIELD OF INVENTION

The present invention relates generally to golf clubs, and particularly, the invention relates to improved golf club heads which utilize composite materials in at least a portion therein. Potentially acceptable composite materials for use as golf club heads include metal matrix composite and/or ceramic matrix composite materials. The use of metal matrix composite or ceramic matrix composite materials in golf club heads result in improved golf clubs.

BACKGROUND OF THE INVENTION

Generally, there are four categories of golf clubs: (1) long distance clubs, such as woods or drivers, and low number irons; (2) intermediate range irons; (3) short range irons; and (4) putters. The properties of composite materials can be optimized for use in golf club heads by the judicious selection of the components of the composite materials, thus providing advantages over traditional materials, such as: wood, forged carbon steels, investment cast stainless steels, copper based alloys, nickel based alloys, cobalt based alloys, and titanium based alloys.

Over many years numerous attempts have been made to optimize the performance of golf clubs. Focus for optimizing performance has been made upon shafts, grips, heads, etc. However, much improvement is still possible in many of those areas as various new technologies are discovered. For example, some efforts have been directed toward proper selection and/or combination of materials for use as golf club heads. However, while some success has been achieved, the potential for further improvement still exists.

An attempt to utilize composite materials in golf club heads is disclosed in U.S. Pat. No. 4,883,275, issued to David D. Boone. This patent teaches that iron golf club heads comprised of an outlying or peripheral structure of a light-weight non-metallic composite material and a metallic insert forming the face, sole, and back weight produces an improved iron golf club head. The improved iron golf club head has a desirable weight distribution, provides for improved utilization of the mass of the head, and allows for improved control of the location of the center of gravity which tends to reduce the likelihood of error in shots. The disadvantage of the Boone Patent is that the outlying non-metallic member is made from an epoxy impregnated graphite. The epoxy of these polymer matrix composites is susceptible to moisture absorption which would distort the outlying member of the club head in humid climates, thus, obviating any of the advantages from use of such materials.

Another attempt to utilize composite materials is disclosed in U.S. Pat. No. 4,768,787, issued to Chester S. Shira, and entitled "Golf Club Including High Friction Striking Surface". This patent discloses a high-friction ball striking surface on the head of a metal iron which permits long term use without deterioration of the friction causing elements in the surface. Specifically, the ball striking surface of the iron head has hard, sharp featured particulates protruding therefrom, which particulates would increase the friction between the ball striking surface and the ball so as to impart a desired backspin on the ball. Another feature of the Shira invention is that the particles are supported in a matrix of a softer metallic material which wears away through use, and continues to expose hard, sharp featured particles embedded therein. One disadvantage of such a surface is that the soft matrix metal placed onto the substrate to embed these protruding sharp featured particles is different from the substrate material of the face; therefore, a difference in properties of the metallic substrate and the embedding matrix might result in spalling of the gripping surface.

U.S. Pat. No. 4,687,205, issued to Tominaga, et al., and entitled "Iron Type Golf Club Head" teaches a method of making an iron type golf club head comprising a composite material of light metal or synthetic resin containing silicon carbide whiskers which consist of 2-80% by volume of the golf club head and which occupy 20% or more by volume of the body of the club head. The club head can be 10-60% lighter than the club head made entirely of steel with the same configuration and size, while the moment of inertia is approximately the same. Weight metal inserts having a specific gravity greater than steel can be embedded in the club head.

DESCRIPTION OF COMMONLY OWNED PATENT APPLICATIONS

The subject matter of this application is related to that of several Commonly Owned Patents and Commonly Owned and Copending Patent Applications. Particularly, these Patents and Patent Applications describe novel methods for making ceramic matrix composite materials (hereinafter sometimes referred to as "Commonly Owned Ceramic Matrix Patent Applications") and metal matrix composite materials (hereinafter sometimes referred to as "Commonly Owned Metal Matrix Patent(s) and Patent Application(s)").

A novel approach to the formation of ceramic materials is disclosed generically in Commonly Owned U.S. Pat. No. 4,713,360, which issued on Dec. 15, 1987 in the names of Marc S. Newkirk et al. and entitled "Novel Ceramic Materials and Methods for Making Same". This Patent discloses a method of producing self-supporting ceramic bodies grown as the oxidation reaction product of a molten parent metal which is reacted with a vapor-phase oxidant to form an oxidation reaction product. Molten metal migrates through the formed oxidation reaction product to react with the oxidant thereby continuously developing a ceramic polycrystalline body which can, if desired, include an interconnected metallic component. The process may be enhanced by the use of one or more dopants alloyed with the parent metal. For example, in the case of oxidizing aluminum in air, it is desirable to alloy magnesium and silicon with the aluminum to produce alpha-alumina ceramic structures. This method was improved upon by the application of dopant materials to the surface of the parent metal, as described in Commonly Owned U.S. Pat. No. 4,853,352, which issued on Aug. 1, 1989, in the names of Marc S. Newkirk et al., and entitled "Methods of Making Self-Supporting Ceramic Materials", a European counterpart to which was published in the EPO on Jan. 22, 1986.

A novel method for producing a self-supporting ceramic composite by growing an oxidation reaction product from a parent metal into a permeable mass of filler is disclosed in commonly owned and copending U.S. patent application Ser. No. 07/443,733, filed Nov. 30, 1989, and entitled "Methods of Making Composite Articles Having Embedded Filler", which is a continuation-in-part of commonly owned and copending U.S. patent application Ser. No. 07/415,180, filed Sep. 29, 1989, which is a divisional application of U.S. Pat. No. 4,916,113, which issued Apr. 10, 1990, and entitled "Methods of Making Composite Ceramic Articles" which is a continuation of U.S. Pat. No. 4,851,375, which issued Jul. 25, 1989, and entitled "Methods of Making Composite Ceramic Articles Having Embedded Filler" all in the names of Marc S. Newkirk, et al.

A method for producing ceramic composite bodies having a predetermined geometry or shape is disclosed in Commonly Owned and Copending U.S. Pat. No. 5,017,526 which issued May 21, 1991, which is a continuation of U.S. application Ser. No. 06/861,025, filed May 8, 1986 (and now abandoned), both in the names of Marc S. Newkirk et al., a European counterpart to which was published in the EPO on Jan. 22, 1986. In accordance with the method in this U.S. patent application, the developing oxidation reaction product infiltrates a permeable preform of filler material in a direction towards a defined surface boundary. It was discovered that high fidelity is more readily achieved by providing the preform with a barrier means, as disclosed in Commonly Owned U.S. patent application Ser. No. 07/295,488, filed Jan. 10, 1989, (and now abandoned) which is a continuation of U.S. Pat. No. 4,923,832, which issued May 8, 1990, both in the names of Marc S. Newkirk et al., a European counterpart to which was published in the EPO on Nov. 11, 1987. The methods disclosed in this patent application and patent produce shaped self-supporting ceramic bodies, including shaped ceramic composites, by growing the oxidation reaction product of a parent metal to a barrier means spaced from the metal for establishing a boundary or surface.

Ceramic composites having a cavity with an interior geometry inversely replicating the shape of a positive mold or pattern are disclosed in Commonly Owned U.S. patent application Ser. No. 07/329,794, filed Mar. 28, 1989, (and now U.S. Pat. No. 5,051,382, issued Sep. 24, 1991) which is a divisional of U.S. Pat. No. 4,828,785, which issued May 9, 1989, both in the names of Marc S. Newkirk, et al., a European counterpart to which was published in the EPO on Sep. 2, 1987, and in U.S. Pat. No. 4,859,640, which issued on Aug. 22, 1989, a European counterpart to which was published in the EPO on Mar. 9, 1988.

The feeding of additional molten parent metal from a reservoir has been successfully utilized to produce thick ceramic matrix composite structures. Particularly, as disclosed in Commonly Owned U.S. Pat. No. 4,918,034, which issued Apr. 17, 1990, which is a continuation-in-part of U.S. Pat. No. 4,900,699, which issued Feb. 13, 1990, both in the names of Marc S. Newkirk et al., and entitled "Reservoir Feed Method of Making Ceramic Composite Structures and Structures Made", a European counterpart to U.S. Pat. No. 4,900,699 was published in the EPO on Mar. 30, 1988. The reservoir feed method has been successfully applied to form ceramic matrix composite structures. According to the method of this Newkirk et al. invention, the ceramic or ceramic composite body which is produced comprises a self-supporting structure which includes a ceramic matrix obtained by the oxidation reaction of a parent metal with an oxidant to form a polycrystalline material. In conducting the process for forming a ceramic composite structure, a body of the parent metal and a permeable filler are oriented relative to each other so that formation of the oxidation reaction product will occur in a direction toward and into the filler. The parent metal is described as being present as a first source and as a reservoir, the reservoir of metal communicating with the first source due to, for example, gravity flow. The first source of molten parent metal reacts with the oxidant to begin the formation of the oxidation reaction product. As the first source of molten parent metal is consumed, it is replenished, preferably by a continuous means, from the reservoir of parent metal as the oxidation reaction product continues to be produced and infiltrates the filler. Thus, the reservoir assures that ample parent metal will be available to continue the process until the oxidation reaction product has grown to a desired extent.

A method for tailoring the constituency of the metallic component of a ceramic matrix composite structure is disclosed in Copending and Commonly Owned U.S. Pat. No. 5,017,533, which issued on May 21, 1991, which in turn is a continuation of U.S. patent application Ser. No. 06/908,454, filed Sep. 17, 1986 (and now abandoned), both of which are in the names of Marc S. Newkirk et al., and entitled "Method for In Situ Tailoring the Metallic Component of Ceramic Articles and Articles Made Thereby".

Moreover, U.S. patent application Ser. No. 07/269,152, filed Nov. 9, 1988 (and now abandoned), which is a continuation of U.S. patent application Ser. No. 07/152,518, (which issued as U.S. Pat. No. 4,818,734,which issued Apr. 4, 1989), in the names of Robert C. Kantner et al., which was a Continuation-in-Part Application of the above-mentioned Ser. No. 06/908,454, having the same title and also being Commonly Owned. This Patent and the above-mentioned application 06/908,454, disclose methods for tailoring the constituency of the metallic component (both isolated and interconnected) of ceramic and ceramic matrix composite bodies during formation thereof to impart one or more desirable characteristics to the resulting body. Thus, desired performance characteristics for the ceramic or ceramic composite body are advantageously achieved by incorporating the desired metallic component in situ, rather than from an extrinsic source, or by post-forming techniques.

As discussed in these Commonly Owned Ceramic Matrix Patent Applications and Patents, novel polycrystalline ceramic materials or polycrystalline ceramic composite materials are produced by the oxidation reaction between a parent metal and an oxidant (e.g., a solid, liquid and/or a gas). In accordance with the generic process disclosed in these Commonly Owned Ceramic Matrix Patent Applications and Patents, a parent metal (e.g., aluminum) is heated to an elevated temperature above its melting point but below the melting point of the oxidation reaction product to form a body of molten parent metal which reacts upon contact with an oxidant to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional fresh oxidation reaction product contact with the oxidant, at the surface of previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as non-oxidized constituents of the parent metal, and/or voids. Oxidation is used in its broad sense in all of the Commonly Owned Ceramic Matrix Patent Applications and Patents and in this application, and refers to the loss or sharing of electrons by a metal to an oxidant which may be one or more elements and/or compounds. Accordingly, elements other than oxygen may serve as an oxidant.

In certain cases, the parent metal may require the presence of one or more dopants in order to influence favorably or to facilitate growth of the oxidation reaction product. Such dopants may at least partially alloy with the parent metal at some point during or prior to growth of the oxidation reaction product. For example, in the case of aluminum as the parent metal and air as the oxidant, dopants such as magnesium and silicon, to name but two of a larger class of dopant materials, can be alloyed with aluminum, and the created growth alloy is utilized as the parent metal. The resulting oxidation reaction product of such a growth alloy, in the case of using oxygen as an oxidant, comprises alumina, typically alpha-alumina.

Novel ceramic composite structures and methods of making the same are also disclosed and claimed in certain of the aforesaid Commonly Owned Ceramic Matrix Patent Applications and Patents which utilize the oxidation reaction to produce ceramic composite structures comprising a substantially inert filler (note: in some cases it may be desirable to use a reactive filler, e.g., a filler which is at least partially reactive with the advancing oxidation reaction product and/or parent metal) infiltrated by the polycrystalline ceramic matrix. A parent metal is positioned adjacent to a mass of permeable filler (or a preform) which can be shaped and treated to be self-supporting, and is then heated to form a body of molten parent metal which is reacted with an oxidant, as described above, to form an oxidation reaction product. As the oxidation reaction product grows and infiltrates the adjacent filler material, molten parent metal is drawn through previously formed oxidation reaction product within the mass of filler and reacts with the oxidant to form additional fresh oxidation reaction product at the surface of the previously formed oxidation reaction product, as described above. The resulting growth of oxidation reaction product infiltrates or embeds the filler and results in the formation of a ceramic composite structure of a polycrystalline ceramic matrix embedding the filler. As also discussed above, the filler (or preform) may utilize a barrier means to establish a boundary or surface for the ceramic composite structure.

E. S. Park and S. O. Poste disclose a novel method for making an open-cell rigid foam having a ceramic skeletal structure in Commonly Owned U.S. Pat. No. 4,808,558, which issued Feb. 28, 1989, a European counterpart to which was published in the EPO on Mar. 23, 1988. The foam is produced by reacting a precursor metal to produce an oxidation reaction product which grows through a permeable layer of inert filler material to form an open cell structure. The filler material, which is deposited as a thin permeable layer on the surfaces of a metal foam, is chosen such that it maintains the original foam structure at the oxidation temperature. The resulting ceramic foam may comprise a tubular structure. Thus, depending on the processing conditions used, the ceramic tubules may have metallic cores, or may be hollow. The examples disclosed in this Patent include AlN powder filler materials and a nitrogenous atmosphere.

Thus, the aforesaid Commonly Owned Ceramic Matrix Patent Applications and Patents describe the production of oxidation reaction products which are readily grown to desired sizes and thicknesses heretofore believed to be difficult, if not impossible, to achieve with conventional ceramic processing techniques.

The production of boride-containing materials has been addressed in commonly owned U.S. Pat. No. 4,885,130 (hereinafter "Patent '130"), which issued Dec. 5, 1989, in the names of Danny R. White, Michael K. Aghajanian and T. Dennis Claar and is entitled "Process for Preparing Self-Supporting Bodies and Products Made Thereby".

Briefly summarizing the disclosure of Patent '130, self-supporting ceramic bodies are produced by utilizing a parent metal infiltration and reaction process (i.e., reactive infiltration) in the presence of a mass comprising boron carbide. Particularly, a bed or mass comprising boron carbide and, optionally, one or more of a boron donor material and a carbon donor material is infiltrated by molten parent metal, and the bed may be comprised entirely of boron carbide or only partially of boron carbide, thus resulting in a self-supporting body comprising, at least in part, one or more parent metal boron-containing compounds, which compounds include a parent metal boride or a parent metal boro carbide, or both, and typically also may include a parent metal carbide. It is also disclosed that the mass comprising boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of Patent '130, a mass comprising boron carbide and, optionally, one or more of a boron donor material and a carbon donor material, is placed adjacent to or in contact with a body of molten metal or metal alloy, which is melted in a substantially inert environment within a particular temperature envelope. The molten metal infiltrates the mass comprising boron carbide and reacts with at least the boron carbide to form at least one reaction product. The boron carbide and/or the boron donor material and/or the carbon donor material is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted mass comprising boron carbide by a wicking or a capillary action. This transported metal forms additional parent metal, boride, carbide, and/or boro carbide and the formation or development of a ceramic body is continued until either the parent metal or mass comprising boron carbide has been consumed, or until the reaction temperature is altered to be outside of he reaction temperature envelope. The resulting structure comprises one or more of a parent metal boride, a parent metal boro compound, a parent metal carbide, a metal ( which, as discussed in Patent '130, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the mass comprising boron carbide, the relative amounts of boron carbide and parent metal, alloys of the parent metal, dilution of the boron carbide with a filler, the amount of boron donor material and/or carbon donor material mixed with the mass comprising boron carbide, temperature, and time. Preferably, conversion of the boron carbide to the parent metal boride, parent metal boro compounds (s) and parent metal carbide is at least about 50%, and most preferably at least about 90%.

The typical environment or atmosphere which was utilized in Patent '130 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Still further, it is disclosed that by adding a carbon donor material (e.g., graphite powder or carbon black) and/or a boron donor material (e.g., a boron powder, silicon borides, nickel borides and iron borides) to the mass of boroncarbide, the ratio or parent metal-boride/-parent metal-carbide can be adjusted. For example, if zirconium is used as the parent metal, the ratio of $ZrB_2/ZrC$ can be reduced if a carbon donor material is utilized (i.e., more ZrC is produced out to the addition of a carbon donor material in the mass of boron carbide) while if a boron donor material is utilized, the ratio of $ZrB_2/Zrc$ can be increased (i.e., more $ZrB_2$ is produced due to the addition of a boron donor material in the mass of boron carbide). Still further, the relative size of $ZrB_2$ platelets which are formed in the body may be larger than platelets that are formed by a similar process without the use of a boron donor material. Thus, the addition of a carbon donor material and/or a boron donor material may also effect the morphology of the resultant material.

In another related patent, specifically, U.S. Pat. No. 4,915,736 (hereinafter referred to as "Patent '736"), issued in the names of Terry Dennis Claar and Gerhard Hans Schiroky, on Apr. 10, 1990, and entitled "A Method of Modifying Ceramic Composite Bodies By a Carburization Process and Articles Made Thereby", additional modification techniques are disclosed. Specifically, Patent '736 discloses that a ceramic composite body made in accordance with the teachings of, for example, Patent '130 can be modified by exposing the composite to a gaseous carburizing species. Such a gaseous carburizing species can be produced by, for example, embedding the composite body in a graphitic bedding and reacting at least a portion of the graphitic bedding with moisture or oxygen in a controlled atmosphere furnace. However, the furnace atmosphere should comprise typically, primarily, a non-reactive gas such as argon. It is not clear whether impurities present in the argon gas supply the necessary $O_2$ for forming a carburizing species, or whether the argon gas merely serves as a vehicle which contains impurities generated by some type of volatilization of components in the graphitic bedding or in the composite body. In addition, a gaseous carburizing species could be introduced directly into a controlled atmosphere furnace during heating of the composite body.

Once the gaseous carburizing species has been introduced into the controlled atmosphere furnace, the setup should be designed in such a manner to permit the carburizing species to be able to contact at least a portion of the surface of the composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the composite body, if desired, by a vacancy diffusion process. Moreover, Patent '736 discloses that by controlling the time, the exposure of the composite body to the carburizing species and/or the temperature at which the carburization process occurs, a carburized zone or layer can be formed on the surface of the composite body. Such process could result in a hard, wear-resistant surface surrounding a core of composite material having a higher metal content and higher fracture toughness.

Thus, if a composite body was formed having a residual parent metal phase in the amount of between about 5-30 volume percent, such composite body could be modified by a post-carburization treatment to result in from about 0 to about 2 volume percent, typically about ½ to about 2 volume percent, of parent metal remaining in the composite body.

Still further, Copending U.S. patent application Ser. No. 07/296,239 (now abandoned), filed on Jan. 12, 1989, is a continuation-in-part application of Patent '736 and discloses that in addition to a carburizing species, a nitriding and/or boriding species may also be utilized to result in similar modifications to the formed composite bodies.

A novel method of making a metal matrix composite material is disclosed in Commonly Owned U.S. Pat. No. 4,828,008, issued May 9, 1989, in the names of White et al., and entitled "Metal Matrix Composites". According to the method of the White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention allows the choice of a balance between infiltration kinetics and nitride formation.

An example of suitable barrier means for use with metal matrix composite formation is described in Commonly Owned U.S. Pat. No. 4,935,055, issued Jun. 19, 1990, in the names of Michael K. Aghajanian et al., and entitled "Method of Making Metal Matrix Composite with the Use of a Barrier". According to the method of this Aghajanian et al. invention, a barrier means (e.g., particulate titanium diboride or a graphite material such as a flexible graphite tape product sold by Union Carbide under the trade name GRAFOIL®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008, was improved upon by Commonly Owned and Copending U.S. patent application Ser. No. 7/517,541, filed Apr. 24, 1990, which is a Rule 62 continuation of U.S. patent application Ser. No. 07/168,284, filed Mar. 15, 1988 (and now abandoned), both in the names of Michael K. Aghajanian and Marc S. Newkirk and entitled "Metal Matrix Composites and Techniques for Making the Same". In accordance with the methods disclosed in this U.S. patent application, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated ceramic body having a metal matrix therein will be directly bonded to excess metal remaining in the reservoir.

Further improvements in metal matrix technology can be found in commonly owned and copending U.S. patent application Ser. No. 07/521,043, filed May 9, 1990, which is a continuation-in-part of U.S. patent application Ser. No. 07/484,753, filed Feb. 23, 1990, which is a continuation-in-part of U.S. patent application Ser. No. 07/432,661, filed Nov. 7, 1989 (and now abandoned), which is a continuation-in-part of U.S. patent application Ser. No. 07/416,327, filed Oct. 6, 1989 (and now abandoned), in the names of Aghajanian, et al. and entitled "A Method of Forming Metal Matrix Composite Bodies by a Spontaneous Infiltration Process, and Products Produced Therefrom". According to this Aghajanian, et al. invention, spontaneous infiltration of a matrix metal into a permeable mass of filler material or preform, at least at some point during the process, which permits molten matrix metal to spontaneously infiltrate the filler material or preform. Aghajanian, et al. disclose a number of matrix metal/infiltration enhancer precursor/infiltrating atmosphere systems which exhibit spontaneous infiltration. Specifically, Aghajanian, et al. disclose that spontaneous infiltration behavior has been observed in the aluminum/magnesium/nitrogen system; the aluminum/strontium/nitrogen system; the aluminum/zinc/oxygen system; and the aluminum/calcium/nitrogen system. However, it is clear from the disclosure set forth in the Aghajanian, et al. invention that the spontaneous infiltration behavior should occur in other matrix metal/infiltration enhancer precursor/infiltrating atmosphere systems.

A novel method of forming a metal matrix composite by infiltration of a permeable mass of filler contained in a ceramic matrix composite mold is disclosed in Commonly Owned U.S. Pat. No. 4,871,008, issued Oct. 3, 1989, which issued from U.S. patent application Ser. No. 07/142,385, filed Jan. 11, 1988, by Dwivedi et al., both entitled "Method of Making Metal Matrix Composites". According to the method of the Dwivedi et al. invention, a mold is formed by the directed oxidation of a molten precursor metal or parent metal with an oxidant to develop or grow a polycrystalline oxidation reaction product which embeds at least a portion of a preform comprised of a suitable filler (referred to as a "first filler"). The formed mold of ceramic matrix composite is then provided with a second filler and the second filler and mold are contacted with molten metal, and the mold contents are hermetically sealed, most typically by introducing at least one molten metal into the entry or opening which seals the mold. The hermetically sealed bedding may contain entrapped air, but the entrapped air and the mold contents are isolated or sealed so as to exclude or shut-out the external or ambient air. By providing a hermetic environment, effective infiltration of the second filler at moderate molten metal temperatures is achieved, and therefore obviates or eliminates any necessity for wetting agents, special alloying ingredients in the molten matrix metal, applied mechanical pressure, applied vacuum, special gas atmospheres or other infiltration expedients.

The above-discussed commonly owned patent describes a method for the production of a metal matrix composite body, which may be bonded to a ceramic matrix composite body, and the novel bodies which are produced therefrom.

A method of forming macrocomposite bodies by a somewhat related process is disclosed in Commonly Owned and Copending U.S. patent application Ser. No. 07/484,575, filed on Feb. 23, 1990, in the names of Marc S. Newkirk et al., and entitled "Methods for Forming Macrocomposite Bodies and Macrocomposite Bodies Produced Thereby". This application is a continuation-in-part application of application Ser. No. 07/405,747, filed on Sep. 11, 1989, (and now abandoned) in the names of Marc S. Newkirk et al., and entitled "Methods for Forming Macrocomposite Bodies and Macrocomposite Bodies Produced Thereby", which in turn is a continuation-in-part application of application Ser. No. 07/376,416, filed on Jul. 7, 1989, (and now abandoned) which is a continuation-in-part of U.S. patent application Ser. No. 07/368,564, filed on Jun. 20, 1989, which is in turn a continuation-in-part of U.S. patent application Ser. No. 07/269,464, filed on Nov. 10 1988, (and now U.S. Pat. No. 5,040,588, issued Aug. 20, 1991) all in the names of Marc S. Newkirk et al., and entitled "Methods for Forming Macrocomposite Bodies and Macrocomposite Bodies Produced Thereby". These applications disclose various methods relating to the formation of macrocomposite bodies by spontaneously infiltrating a permeable mass of filler material or a preform with molten matrix metal and bonding the spontaneously infiltrated material to at least one second material such as a ceramic and/or a metal. Particularly, an infiltration enhancer and/or infiltration enhancer precursor and/or infiltrating atmosphere are in communication with a filler material or a preform, at least at some point during the process, which permits molten matrix metal to spontaneously infiltrate the filler material or preform. Moreover, prior to infiltration, the filler material or preform is placed into contact with at least a portion of a second material such that after infiltration of the filler material or preform, the infiltrated material is bonded to the second material, thereby forming a macrocomposite body.

A method of forming metal matrix composite bodies by a self-generated vacuum process similar to the process of the instant invention is disclosed in Commonly Owned and Copending U.S. patent application Ser. No. 07/381,523, filed on Jul. 18, 1989, in the names of Robert C. Kantner et al., and entitled "A Method of Forming Metal Matrix Composite Bodies by a Self-Generated Vacuum Process and Products Produced Therefrom". This patent application discloses a method whereby a molten matrix metal is contacted with a filler material or a preform in the presence of a reactive atmosphere, and, at least at some point during the process, the molten matrix metal reacts, either partially or substantially completely, with the reactive atmosphere, thereby causing the molten matrix metal to infiltrate the filler material or preform due to, at least in part, the creation of a self-generated vacuum. Such self-generated vacuum infiltration occurs without the application of any external pressure or vacuum.

The entire disclosures of the above-described commonly owned patents and patent applications are expressly incorporated herein by reference.

SUMMARY OF THE INVENTION

This invention relates to improved golf clubs, and specifically, to golf club heads comprised of plastics, plastic matrix composites, metals, metal matrix composites, ceramics, ceramic matrix composites, glass matrix composites, carbon-carbon composites, and combinations thereof. Specifically, this invention relates to golf club heads including a portion comprising at least one of a plastic matrix composite, a metal matrix composite, a ceramic matrix composite, a glass matrix composite, and a carbon-carbon composite, and specifically, at least one of a metal matrix composite and ceramic matrix composite and more specifically, at least one of a metal matrix composite and a ceramic matrix composite described in the above-identified commonly owned patents and patent applications.

Generally, there are four categories of golf clubs: (1) long distance clubs, such as woods or drivers, and low number irons; (2) intermediate range irons; (3) short range irons; and (4) putters. The properties of composite materials can be optimized for use in golf club heads by the judicious selection of the components of the composite materials, thus, providing advantages over traditional materials, such as: wood, forged carbon steels, investment cast stainless steels, copper based alloys, nickel based alloys, cobalt based alloys, and titanium based alloys.

Advantages that might be obtainable in golf club heads and therefore golf clubs comprising composite materials include better mass distributions to enhance the golf club inertia that could maintain the golf club head path constant through contact with the golf ball. Likewise, the distribution of materials in a golf club head, for example, by grading the filler loading within the composite material (for example, a striking face insert), or by combining various materials in the golf club head to provide optimum momentum transfer from the golf club head to the golf ball, therefore, producing a better golf club. Still other advantages of using composite materials might include densities lower than that of steel, increased striking surface size, and therefore "sweet spot" size, while maintaining club head weight to prescribed U.S. Golf Association Rules.

Composite materials are generally preferred over traditional materials because their properties are tailorable to a specific application. Golf clubs and golf club heads are a natural fit for composite materials because each type of club is designed for a specific purpose. Moreover, within a club type, each club is further specialize, e.g., a No. 1 iron is for distance shots from the fairway to the green, while a No. 9 iron is for accuracy from the fairway proximate the green to the green. Specific properties of metal matrix composites that are tailorable include: stiffness or Youngs modulus, density, toughness, and hardness. These properties may be tailored by varying filler loading, and varying the matrix metal. Moreover, these properties might be tailored to vary within a component of the golf club head by grading the filler loading within the component. For example, a golf club insert might have a high filler loading in the area of the "sweet spot" to provide great stiffness, ball gripping, and wear resistance. Likewise, the properties of individual clubs within a club type can have the properties tailored to the specific requirements of the club. For example, the metal matrix composite used in the fabrications of a No. 1 iron, a distance club, might be different than that within a No. 9 iron, an accuracy club. Likewise, ceramic matrix composite properties that are tailorable include stiffness or Youngs modulus, density, toughness, and hardness. As with metal matrix composite, ceramic matrix composite can have graded properties within components and among clubs.

In a preferred embodiment of the instant invention, a golf club head is comprised substantially completely of either a plastic matrix composite, a metal matrix composite, a ceramic matrix composite, a glass matrix composite, or a carbon-carbon composite. Specifically, in a first embodiment of the instant application, golf club heads are made substantially completely from either a metal matrix composite or a ceramic matrix composite and more specifically, a metal matrix or a ceramic matrix composite described in the above-identified and commonly owned patents and patent applications. Golf club heads may be formed by, for example, injection molding a polymer resin into a mold having a shape corresponding to that of a gold club head. The mold would contain a reinforcement material such as inorganic fibers, metal filler materials, or ceramic filler materials. Another method for forming golf club heads might include: sintering or hot isostatic pressing preforms of metallic powders and fiber or whisker, and/or ceramic powders and fibers or whiskers and a combinations of metallic and ceramic components. Additionally, golf club heads may be formed by either spontaneously infiltrating or infiltrating with a self-generated vacuum, a matrix metal into a filler material or a preform of filler material shaped to correspond to the desired golf club head. Likewise, golf club heads may be formed by the directed oxidation of a parent metal into a filler material or a preform of filler material shaped to correspond to the desired golf club head. Additionally, golf club heads may be formed by reactively infiltrating a parent metal into a solid oxidant combined optionally with a filler material or a preform of solid oxidant combined optionally with a filler material shaped to correspond to the desired golf club head. A golf club head comprised of metal matrix composites or ceramic matrix composites might be larger than golf club heads made from, for example, steels when the density of either the metal matrix composite or ceramic matrix composite is less than that of steel. A benefit of making golf club heads from a metal matrix composite or a ceramic matrix composite with a density less than that of steel is that the striking face may be enlarged for a given golf club head size designation while complying with U.S. Golf Associates weight rules. Therefore, a larger "sweet spot" size on an enlarged striking face size would result. The mechanical properties of metal matrix composite and/or ceramic matrix composite golf club heads may be tailored by appropriately selecting either a matrix metal or a parent metals, filler material size or size distribution and filler material composition or combinations thereof. Moreover, the mechanical properties of metal matrix, and/or ceramic matrix golf club head may be graded to by grading the filler material loading and/or the filler material composition. Specifically, the graded metal matrix or ceramic matrix composite golf club head may be tailored to have the mass of the golf club head either behind or at the perimeter of the striking surface. Such composite material designs would allow the inertia of a swinging golf club head to be transferred to a golf ball while potentially minimizing or eliminating either distortions or twisting in the striking face when contacting the golf ball, thereby reducing potential cases of slicing and hooking. Specific mechanical properties of metal matrix composites and ceramic matrix composite that might be tailored include, for example, stiffness or elastic modulus, wear resistance, density, toughness, hardness, and damping capacity. The elastic modulus might be tailored for improved momentum transfer from the golf club head to the golf ball.

In a second preferred embodiment of the instant invention, golf club heads comprising a macrocomposite are made by combining plastics or polymers, plastic or polymer matrix composites, wood, metals, metal matrix composites, ceramics, ceramic matrix composites, glass matrix composites, and carbon-carbon composites. Specifically, golf club heads comprising a macrocomposite are made by combining at least a metal matrix composite or a ceramic matrix composite with at least one second material (e.g., metal, plastic, ceramic composites, etc.) which may also include a metal matrix and more specifically, by combining at least a metal matrix composite or a ceramic matrix composite described in the above-identified commonly owned patents and patent applications. The component materials of golf club heads are combined by a fastening means. Such fastening means includes, for example, but is not limited to, screwing, bolting, riveting, resin bonding, soldering, welding, glueing, mechanically interlocking, shrink fitting, etc. In this embodiment any of the golf club body, the insert, and the soul plate may be made from a commercially available material and at least a portion of at least one of the golf club body, the insert, and the soul plate may be made from one of a metal matrix composite and a ceramic matrix composite, and more specifically, from one of a metal matrix composite and a ceramic matrix composite described the above-identified commonly owned patents and patent applications. These components may be combined by a fastening means to form a golf club head. A wood or driver golf club head of this second embodiment might include a body of a metal matrix composite, an insert of one type of ceramic matrix composite, and a soul plate of a second type of ceramic matrix composite combined by a fastening means.

As with the wood or driver golf club head, any of a golf club body and an insert may be made from a commercially available material and at least a portion of at least one of a golf club body and an insert may be made from at least one of a metal matrix composite and a ceramic matrix composite, and specifically, at least one of a metal matrix composite and a ceramic matrix composite of the above-identified commonly owned patents and patent applications. The components may be combined by a fastening means to form a golf club head. The mechanical properties of the components of the golf club head may be tailored by selecting appropriate matrix or parent metals, filler material size or size distribution, and filler material composition. Moreover, the mechanical properties of metal matrix and ceramic matrix composite golf club head components may be graded by grading the filler material loading and/or the filler material size distribution and/or the filler material composition. Specific mechanical properties that might be tailored include, for example, stiffness or elastic modulus and damping capacity. The elastic modulus of an insert might be tailored, for example, to improve momentum transfer from the golf club head to the golf ball while the body of the golf club head may be designed for optimum mass distribution to provide inertia to the golf club head that would resists destortions of the golf club head upon contact with a golf ball thereby reducing slicing and hooking.

In a third preferred embodiment of the instant invention, golf club heads comprising a macrocomposite are made by combining in situ: plastics polymers, wood, ceramics, ceramic composite, metal, metal matrix composites, plastic matrix composites or polymer matrix composites, glass matrix composites, and carbon-carbon composites, etc. Specifically, golf club heads comprising a macrocomposite may be made by combining in situ at least a metal matrix composite or a ceramic matrix composite with at least one second material (e.g., metal, plastic, ceramic, composite, etc.) and more specifically, by combining in situ at least a metal matrix or a ceramic matrix composite described in the above-identified commonly owned patents and patent applications. This third embodiment differs from the second embodiment in that the portions of the components of the golf club head are combined in situ, that is during the formation of at least one of the materials. As a first example, a ceramic insert having a striking surface might be incorporated in a preform of filler material having a shape corresponding to that of a golf club head. The preform incorporating the insert might then be either spontaneously infiltrated with a matrix metal, infiltrated by a self-generated vacuum with a matrix metal, infiltrated with a product of a directed oxidation of a parent metal, or reactively infiltrated by a parent metal reacting with a solid oxidant contained in the filler material. During any of these steps, the product, either a metal matrix composite or a ceramic matrix composite, comprising a portion of the golf club head body, would integrally bond to the insert thereby forming a macrocomposite golf club head. As a second example of this embodiment, the insert may incorporate into the body of the golf club head by incorporating a material with a melting temperature lower than that of the body. An example for this variant of the third embodiment might include forming a metal matrix composite golf club body having a recess with a insert receiving surface and molding a lower melting material (e.g., plastic, polymer matrix composite, low melting metal, etc.) into the recess and thereby integrally bonding to the golf club head body. The material combinations of for this third embodiment should not be limited to the above two examples. The mechanical properties of the components of the golf club head can be tailored by selecting appropriate matrix metals or parent metals, filler material size or size distribution, and filler material composition. Moreover, the mechanical properties of metal matrix, and ceramic matrix golf club head components may be graded by grading the filler material loading and/or selecting a specific filler material size distribution and/or selecting a specific filler material composition. Specific mechanical properties that might be tailored include, for example, stiffness or elastic modulus wear resistance, density, toughness, hardness and damping capacity. The elastic modulus of an insert might be tailored, for example, to improve momentum transfer from the golf club head to the golf ball without the twisting of the golf club head during contact with the golf ball.

Another advantage of such an in situ formed macrocomposite golf club head would be improved accuracy of shots, greater distances of shots and improved forgiveness of misshots thereby potentially reducing hooking and slicing of the golf ball.

DEFINITIONS

"Active Filler", as used herein, means fillers which provide nucleation sites and/or act as catalysts for ceramic matrix formation.

"Alloy Side" as used herein, in conjunction with ceramic matrix composite, refers to that side of the ceramic matrix composite which initially contacted molten metal before the oxidation reaction product of that molten metal and an oxidant infiltrated the preform or mass of filler material.

In conjunction with metal matrix composite, refers to that side of a metal matrix composite which initially contacted molten matrix metal before that molten metal infiltrated the permeable mass of filler material or preform.

"Aluminum", as used herein, means and includes essentially pure metal (e.g., relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Ambient Atmosphere", as used herein, refers to the atmosphere outside the filler material or preform and the impermeable container. It may have substantially the same constituents as the reactive atmosphere, or it may have different constituents.

"Balance Non-Oxidizing Gas", as used herein, means that any gas present in addition to the primary or oxidizing gas (if utilized) comprising the vapor-phase oxidant or infiltrating atmosphere that is either an inert gas or a reducing gas which is substantially non-reactive with the parent metal or matrix metal under the process conditions. Any oxidizing gas which may be present as an impurity in the gas(es) used should be insufficient to oxidize the parent metal or matrix metal to any substantial extent under the process conditions.

"Barrier" or "barrier means", as used herein in conjunction with ceramic matrix composite bodies, means any material, compound, element, composition, or the like, which, under the process conditions, maintains some integrity, is not substantially volatile (i.e., the barrier material does not volatilize to such an extent that it is rendered non-functional as a barrier) and is preferably permeable to a vapor-phase oxidant (if utilized) while being capable of locally inhibiting, poisoning, stopping, interfering with, preventing, or the like, continued growth of the oxidation reaction product.

"Barrier" or "barrier means", as used herein, in conjunction with metal matrix composite bodies, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered non-functional as a barrier).

Further, suitable "barrier means" includes materials which are either wettable or non-wettable by the migrating molten matrix metal under the process conditions employed, so long as wetting of the barrier means does not proceed substantially beyond the surface of the barrier material (i.e., surface wetting). A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product.

"Bonded", as used herein, means any method of attachment between two bodies. The attachment may be physical and/or chemical and/or mechanical. A physical attachment requires that at least one of the two bodies, usually in a liquid state, infiltrates at least a portion of the microstructure of the other body. This phenomenon is commonly known as "wetting". A chemical attachment requires that at least one of the two bodies chemically react with the other body to form at least one chemical bond between the two bodies. One method of forming a mechanical attachment between the two bodies includes a macroscopic infiltration of at least one of the two bodies into the interior of the other body. An example of this would be the infiltration of at least one of the two bodies into a groove or slot on the surface of the other body. Such mechanical attachment does not include microscopic infiltration or "wetting" but may be used in combination with such physical attachment techniques.

An additional method of mechanical attachment includes such techniques as "shrink fitting", wherein one body is attached to the other body by a pressure fit. In this method of mechanical attachment, one of the bodies would be placed under compression by the other body.

"Bronze", as used herein, means and includes a copper rich alloy, which may include iron, tin, zinc, aluminum, silicon, beryllium, manganese and/or lead. Specific bronze alloys include those alloys in which the proportion of copper is about 90% by weight, the proportion of silicon is about 6% by weight, and the proportion of iron is about 3% by weight.

"Carcass" or "Parent Metal Carcass", as used herein, in conjunction with ceramic matrix composites, refers to any of the original body of parent metal remaining which has not been consumed during formation of the ceramic body, or the ceramic composite body, and typically, which remains in at least partial contact with the formed body. It should be understood that the carcass may also typically include some oxidized constituents of the parent metal and/or a second or foreign metal therein.

"Carcass" or "Carcass of Matrix Metal", as used herein, in conjunction with metal matrix composites, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Cast Iron", as used herein, refers to the family of cast ferrous alloys wherein the proportion of carbon is at least about 2% by weight.

"Ceramic", as used herein, should not be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents (isolated and/or interconnected, depending on the processing conditions used to form the body) derived from the parent metal, or reduced from the oxidant or a dopant, most typically within a range of from about 1–40 percent by volume, but may include still more metal.

"Ceramic Matrix Composite" or "CMC" or "Ceramic Composite Body", as used herein, means a material comprising a two- or three-dimensionally interconnected ceramic which has embedded a preform or filler material, and may further include a parent metal phase embedded therein, possibly in a two- or three-dimensionally interconnected network. The ceramic may include various dopant elements to provide a specifically desired microstructure, or specifically desired mechanical, physical, or chemical properties in the resulting composite.

"Copper", as used herein, refers to the commercial grades of the substantially pure metal, e.g., 99% by weight copper with varying amounts of impurities contained therein. Moreover, it also refers to metals which are alloys or intermetallics which do not fall within the definition of bronze, and which contain copper as the major constituent therein.

"Dopants", as used herein, means materials (parent metal constituents or constituents combined with and-/or included in or on a filler, or combined with the oxidant) which, when used in combination with the parent metal, favorably influence or promote the oxidation reaction process and/or modify the growth process to alter the microstructure and/or properties of the product. While not wishing to be bound by any particular theory or explanation of the function of dopants, it appears that some dopants are useful in promoting oxidation reaction product formation in cases where appropriate surface energy relationships between the parent metal and its oxidation reaction product do not intrinsically exist so as to promote such formation. Dopants may be added to the filler material, they may be in the form of a gas, solid, or liquid under the process conditions, they may be included as constituents of the parent metal, or they may be added to any one of the constituents involved in the formation of the oxidation reaction product. Dopants may: (1) create favorable surface energy relationships which enhance or induce the wetting of the oxidation reaction product by the molten parent metal; and/or (2) form a "precursor layer" at the growth surface by reaction with alloy, oxidant, and/or filler, that (a) minimizes formation of a protective and coherent oxidation reaction product layer(s), (b) may enhance oxidant solubility (and thus permeability) in molten metal, and/or (c) allows for transport of oxidant from the oxidizing atmosphere through any precursor oxide layer to combine subsequently with the molten metal to form another oxidation reaction product; and/or (3) cause microstructural modifications of the oxidation reaction product as it is formed or subsequently and/or alter the metallic constituent composition and properties of such oxidation reaction product; and/or (4) enhance growth nucleation and uniformity of growth of oxidation reaction product.

"Excess Matrix Metal" or "Residual Matrix Metal", as used herein, in conjunction with metal matrix composites, means that quantity or amount of matrix metal which remains after a desired amount of spontaneous infiltration into a filler material or preform has been achieved and which is intimately bonded to the formed metal matrix composite. The excess or residual matrix metal may have a composition which is the same as or different from the matrix metal which has spontaneously infiltrated the filler material or preform.

"Filler", as used herein, in conjunction with ceramic matrix composites, means either single constituents or mixtures of constituents which are substantially non-reactive with and/or of limited solubility in the parent metal) and/or oxidation reaction product and may be single or multi-phase. Fillers may be provided in a wide variety of forms, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and coated fillers such as carbon fibers coated with alumina or silicon carbide to protect the carbon from attack, for example, by a molten aluminum parent metal. Fillers may also include metals. For example, refractory metals such as tungsten, tantalum and molybdenum could be used as fillers.

"Filler", as used herein, in conjunction with metal matrix composites, is intended to include either single constituents or mixtures of constituents which are substantially non-reactive with and/or of limited solubility in the matrix metal and may be single or multi-phase. Fillers may be provided in a wide variety of forms, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum parent metal. Fillers may also include metals.

"Green", as used herein in conjunction with filler materials and preforms, refers to a filler material or preform before any growth of oxidation reaction product into the filler material or preform has occurred. Thus a filler material or preform that has been fired at an elevated temperature (for example, to volatilize a binder) should be considered to be "green" so long as the filler material or preform has not been infiltrated by either the parent metal or the oxidation reaction product.

"Growth Alloy", as used herein, in conjunction with ceramic matrix composites, means any alloy containing initially, or at some point during processing obtaining, a sufficient amount of requisite constituents to result in growth of oxidation reaction product therefrom. Growth alloy may differ from a parent metal in that the growth alloy may include constituents not present in the parent metal, but incorporated into the molten alloy during growth.

"Impermeable Container", as used herein, means a container which may house or contain a reactive atmosphere and a filler material (or preform) and/or molten matrix metal and/or a sealing means and/or at least a portion of at least one second material, under the process conditions, and which is sufficiently impermeable to the transport of gaseous or vapor species through the container, such that a pressure difference between the ambient atmosphere and the reactive atmosphere can be established.

"Infiltrating Atmosphere", as used herein, means that atmosphere which is present which interacts with the matrix metal and/or preform (or filler material) and/or infiltration enhancer precursor and/or infiltration enhancer and permits or enhances spontaneous infiltration of the matrix metal to occur.

"Infiltration Enhancer", as used herein, means a material which promotes or assists in the spontaneous infiltration of a matrix metal into a filler material or preform. An infiltration enhancer may be formed from, for example, (1) a reaction of an infiltration enhancer precursor with an infiltrating atmosphere to form a gaseous species and/or (2) a reaction product of the infiltration enhancer precursor and the infiltrating atmosphere and/or (3) a reaction product of the infiltration enhancer precursor and the filler material or preform. Moreover, the infiltration enhancer may be supplied directly to at least one of the preform, and/or matrix metal, and/or infiltrating atmosphere and function in a substantially similar manner to an infiltration enhancer which has formed as a reaction between an infiltration enhancer precursor and another species. Ultimately, at least during the spontaneous infiltration, the infiltration enhancer should be located in at least a portion of the filler material or preform to achieve spontaneous infiltration.

"Infiltration Enhancer Precursor" or "Precursor to the Infiltration Enhancer", as used herein, means a material which when used in combination with the matrix metal, preform and/or infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact with the infiltrating atmosphere and/or the preform or filler material and/or metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

"Liquid-Phase Oxidant" or "Liquid Oxidant", as used herein, in means an oxidant in which the identified liquid is the sole, predominant or at least a significant oxidizer of the parent or precursor metal under the conditions of the process.

Reference to a liquid oxidant means one which is a liquid under the oxidation reaction conditions. Accordingly, a liquid oxidant may have a solid precursor, such as a salt, which is molten at the oxidation reaction conditions. Alternatively, the liquid oxidant may have a liquid precursor (e.g., a solution of a material) which is used to impregnate part or all of the filler and which is melted or decomposed at the oxidation reaction conditions to provide a suitable oxidant moiety. Examples of liquid oxidants as herein defined include low melting glasses.

If a liquid oxidant is employed in conjunction with the parent metal and a filler, typically, the entire bed of filler, or that portion comprising the desired ceramic body, is impregnated with the oxidant (e.g., by coating or immersion in the oxidant).

"Macrocomposite" or "Macrocomposite Body", as used herein, means any combination of two or more materials selected from the group consisting of a ceramic body, a ceramic matrix composite body, a metal body, and a metal matrix composite body, which are intimately bonded together in any configuration, wherein at least one of the materials comprises a metal matrix composite body formed by a self-generated vacuum technique or by a spontaneous infiltration technique, or a ceramic matrix composite body formed by a directed oxidation technique. The metal matrix composite body or ceramic matrix composite body may be present as an exterior surface and/or as an interior surface. Further, the metal matrix composite body or the ceramic matrix composite body may be present as an interlayer between two or more of the materials in the group described above. It should be understood that the order, number, and/or location of a metal matrix composite body or a ceramic matrix composite body, or bodies relative to residual matrix metal or parent metal and/or any of the materials in the group discussed above, can be manipulated or controlled in an unlimited fashion.

"Matrix Metal" or "Matrix Metal Alloy", as used herein, means that metal which is utilized to form a metal matrix composite (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or "Spontaneous System", as used herein, refers to that combination of materials which exhibits spontaneous infiltration into a preform or filler material. It should be understood that whenever a "/" appears between an exemplary matrix metal, infiltration enhancer precursor and infiltrating atmosphere that, the "/" is used to designate a system or combination of materials which, when combined in a particular manner, exhibits spontaneous infiltration into a preform or filler material.

"Metal Matrix Composite" or "MMC", as used herein means a material comprising a two- or three-dimensionally interconnected alloy or matrix metal which has embedded a preform or filler material. The matrix metal may include various alloying elements to provide specifically desired mechanical and physical properties in the resulting composite.

"Nitrogen-Containing Gas Oxidant", as used herein, means a particular gas or vapor in which nitrogen is the sole, predominant or at least a significant oxidizer of the parent or precursor metal under the conditions existing in the oxidizing environment utilized. The nitrogen could be molecular nitrogen (i.e., $N_2$) or could be contained in a compound such as $NH_3$.

"Nonreactive Vessel for Housing Matrix Metal" means any vessel which can house or contain molten matrix metal under the process conditions and not react with the matrix and/or the infiltrating atmosphere and/or infiltration enhancer precursor and/or filler material or preform in a manner which would be significantly detrimental to the spontaneous infiltration mechanism.

"Oxidant", as used herein, means one or more suitable electron acceptors or electron sharers and may be a solid, a liquid or a gas or some combination of these (e.g., a solid and a gas) at the oxidation reaction conditions. Typical oxidants include, without limitation, oxygen, nitrogen, any halogen or a combination thereof, sulphur, phosphorus, arsenic, carbon, boron, selenium, tellurium, and or compounds and combinations thereof, for example, silica or silicates (as sources of oxygen), methane, ethane, propane, acetylene, ethylene, propylene (the hydrocarbon as a source of carbon), and mixtures such as air, $H_2/H_2O$ and $CO/CO_2$ (as sources of oxygen). The latter two (i.e., $H_2/H_2O$ and $CO/CO_2$) being useful in reducing the oxygen activity of the environment.

"Oxidation", as used herein means a chemical reaction in which an oxidant reacts with a parent metal, and that parent metal has given up electrons to or shared electrons with the oxidant.

"Oxidation Reaction Product", as used herein, means one or more metals in any oxidized state wherein the metal(s) has given up electrons to or shared electrons with another element, compound, or combination thereof. Accordingly, an "oxidation reaction product" under this definition includes the product of the reaction of one or more metals with one or more oxidants.

"Oxygen-Containing Gas Oxidant", as used herein, means a particular gas or vapor in which oxygen is the sole, predominant or at least a significant oxidizer or the parent or precursor metal under the conditions existing in the oxidizing environment utilized.

"Parent Metal", as used herein, means that metal(s) (e.g., aluminum, silicon, titanium, tin and/or zirconium) which is the precursor of a polycrystalline oxidation reaction product (e.g., oxides, parent metal borides, or other parent metal boron compounds, etc.) and includes that metal(s) as an essentially pure metal, a commercially available metal having impurities and/or alloying constituents therein, or an alloy in which that metal precursor is the major constituent. When a specified metal is mentioned as the parent or precursor metal (e.g., aluminum, zirconium, etc.), the metal identified should be read with this definition in mind unless indicated otherwise by the context.

A Metal "Different" from the parent metal means a metal which does not contain, as a primary constituent, the same metal as the parent metal (e.g., if the primary constituent of the parent metal is aluminum, the "different" metal could have a primary constituent of, for example, nickel).

"Parent metal boride" and "parent metal boron compounds" mean a reaction product containing boron formed upon reaction between boron carbide and the parent metal and includes a binary compound of boron with the parent metal as well as ternary or higher order compounds.

"Preform" or "Permeable Preform", as used herein, means a porous mass of filler or filler material which is manufactured with at least one surface boundary which essentially defines a boundary for infiltrating matrix metal or oxidation reaction product, such mass retaining sufficient shape integrity and green strength to provide dimensional fidelity without any external means of support prior to being infiltrated by the matrix metal or the oxidation reaction product. The mass should be sufficiently porous to permit infiltration of the matrix metal or the oxidation reaction product. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Product Releasers", as used herein, means materials that facilitate the release of the ceramic matrix composite from the parent metal carcass after growth is substantially completed.

"Reaction System", as used herein, refers to that combination of materials which exhibit self-generated vacuum infiltration of a molten matrix metal into a filler material or preform. A reaction system comprises at least an impermeable container having therein a permeable mass of filler material or preform, a reactive atmosphere and a matrix metal.

"Reactive Atmosphere", as used herein, means an atmosphere which may react with the matrix metal and/or filler material (or preform) and/or impermeable container to form a self-generated vacuum, thereby causing molten matrix metal to infiltrate into the filler material (or preform) upon formation of the self-generated vacuum.

"Reactive Filler" means that the filler interacts with molten parent metal or molten matrix metal (e.g., is reduced by the parent metal and/or oxidation reaction product and thus modifies the composition of the parent metal and/or provides an oxidant for formation of the oxidation reaction product).

"Reservoir", as used herein, in conjunction with ceramic matrix composites, means a separate body of parent metal positioned relative to a mass of filler or a preform so that, when the metal is molten, the reservoir may flow to replenish, or in some cases to initially provide and subsequently replenish, that portion, segment or source of parent metal which is in contact with the filler or preform and infiltrating and/or reacting to form the oxidation reaction product. The reservoir may also be used to provide a metal which is different from the parent metal.

"Reservoir", as used herein, in conjunction with metal matrix composites, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or preform.

"Seal" or "Sealing Means", as used herein, refers to a gas-impermeable seal under the process conditions, whether formed independent of (e.g., an extrinsic seal) or formed by the reaction system (e.g., an intrinsic seal), which isolates the ambient atmosphere from the reactive atmosphere. The seal or sealing means may have a composition different from that of the matrix metal.

"Seal Facilitator", as used herein, is a material that facilitates formation of a seal upon reaction of the matrix metal with the ambient atmosphere and/or the impermeable container and/or the filler material or preform. The material may be added to the matrix metal, and the presence of the seal facilitator in the matrix metal may enhance the properties of the resultant composite body.

"Second or Foreign Metal", as used herein, means any suitable metal, combination of metals, alloys, intermetallic compounds, or sources of either, which is, or is desired to be, incorporated into the metallic component of a formed ceramic composite body in lieu of, in addition to, or in combination with unoxidized constituents of the parent metal. This definition includes intermetallic compounds, alloys, solid solutions or the like formed between the parent metal and a second metal.

"Second Body" or "Additional Body", as used herein, means another body which is capable of being bonded to a metal matrix composite body by at least one of a chemical reaction and/or a mechanical or shrink fit. Such a body includes traditional ceramics such as sintered ceramics, hot pressed ceramics, extruded ceramics, etc., and also, non-traditional ceramic and ceramic composite bodies such as those produced by the methods described in Commonly Owned U.S. Pat. No. 4,713,360, which issued Dec. 15, 1987, in the names of Marc S. Newkirk et al.; Commonly Owned U.S. Pat. No. 4,851,375, which issued on Jul. 25, 1989, in the names of Marc S. Newkirk et al., and entitled "Methods of Making Composite Ceramic Articles Having Embedded Filler", Commonly Owned and Copending U.S. patent application Ser. No. 861,025, filed May 8, 1986 (and now abandoned), in the names of Marc S. Newkirk et al., and entitled "Shaped Ceramic Composites Making the Same"; Commonly Owned U.S. Pat. No. 4,818,734, which issued on Apr. 4, 1989, in the names of Robert C. Kantner et al., and entitled "Method For In Situ Tailoring the Metallic Component of Ceramic Articles and Articles Made Thereby", now allowed; Commonly Owned and U.S. Pat. No. 4,940,679 which issued on July. 10, 1990, in the names of T. Dennis Claar et al., and entitled "Process for Preparing Self-Supporting Bodies and Products Made Thereby"; and variations and improvements on these processes contained in other Commonly Owned Allowed and Copending U.S. Applications. For the purpose of teaching the method of production and characteristics of the ceramic and ceramic composite bodies disclosed and claimed in these commonly owned applications, the entire disclosures of the above-mentioned applications are hereby incorporated by reference. Moreover, the second or additional body of the instant invention also includes metal matrix composites and structural bodies of metal such as high temperature metals, corrosion resistant metals, erosion resistant metals, weldable metals, solderable metals, etc. Accordingly, a second or additional body includes a virtually unlimited number of bodies.

"Second Material", as used herein, refers to a material selected from the group consisting of a ceramic matrix body, a ceramic matrix composite body, a metal body, and a metal matrix composite body.

"Solid-Phase Oxidant" or "Solid Oxidant", as used herein, means an oxidant in which the identified solid is the sole, predominant or at least a significant oxidizer of the parent or precursor metal under the conditions of the process. When a solid oxidant is employed in conjunction with the parent metal and a filler, it is usually dispersed throughout the entire bed of filler or that portion of the bed into which the oxidation reaction product will grow, the solid oxidant being, for example, particulates admixed with the filler or coatings on the filler particles. Any suitable solid oxidant may be thus employed including elements, such as boron or carbon, or reducible compounds, such as silicon dioxide or certain borides of lower thermodynamic stability than the boride reaction product of the parent metal. For example, when boron or a reducible boride is used as a solid oxidant for an aluminum parent metal, the resulting oxidation reaction product comprises aluminum boride.

In some instances, the oxidation reaction of the parent metal may proceed so rapidly with a solid oxidant that the oxidation reaction product tends to fuse due to the exothermic nature of the process. This occurrence can degrade the microstructural uniformity of the ceramic body. This rapid exothermic reaction can be ameliorated by mixing into the composition relatively inert fillers which absorb the excess heat. An example of such a suitable inert filler is one which is identical, or substantially identical, to the intended oxidation reaction product.

"Spontaneous Infiltration", as used herein, means that the infiltration of matrix metal into the permeable mass of filler or preform occurs without requirement for the application of pressure or vacuum (whether externally applied or internally created).

"Vapor-Phase Oxidant", as used herein, means an oxidant which contains or comprises a particular gas or vapor or further means an oxidant in which the identified gas or vapor is the sole, predominant or at least a significant oxidizer of the parent or precursor metal under the conditions obtained in the oxidizing environment utilized. For example although the major constituent of air is nitrogen, the oxygen content of air is the sole oxidizer for the parent metal because oxygen is a significantly stronger oxidant than nitrogen. Air therefore falls within the definition of an "Oxygen-Containing Gas Oxidant" but not within the definition of a "Nitrogen-Containing Gas Oxidant" (an example of a "nitrogen-containing gas" oxidant is forming gas, which typically contains about 96 volume percent nitrogen and about 4 volume percent hydrogen) as those terms are used herein and in the claims.

"Weight Gain", as used herein, means the percentage weight gain of the ingot/filler combination with respect to the weight of the ingot alone before initiation of the oxidation reaction. The weight gain can therefore be calculated by measuring the weight of the ingot/filler after growth, subtracting the weight of the ingot/filler before growth dividing by the weight of the ingot before growth and multiplied by 100.

"Wetting Enhancer", as used herein, refers to any material, which when added to the matrix metal and/or the filler material or preform, enhances the wetting (e.g., reduces surface tension of molten matrix metal) of the filler material or preform by the molten matrix metal. The presence of the wetting enhancer may also enhance the properties of the resultant metal matrix composite body by, for example, enhancing bonding between the matrix metal and the filler material.

BRIEF DESCRIPTION OF THE DRAWINGS

FIG. 1 is a schematic of a wood or driver golf club head;

FIG. 2 is a schematic of a putter golf club head;

FIG. 3 is a schematic of an iron golf club head;

DETAILED DESCRIPTION

Figure 4:
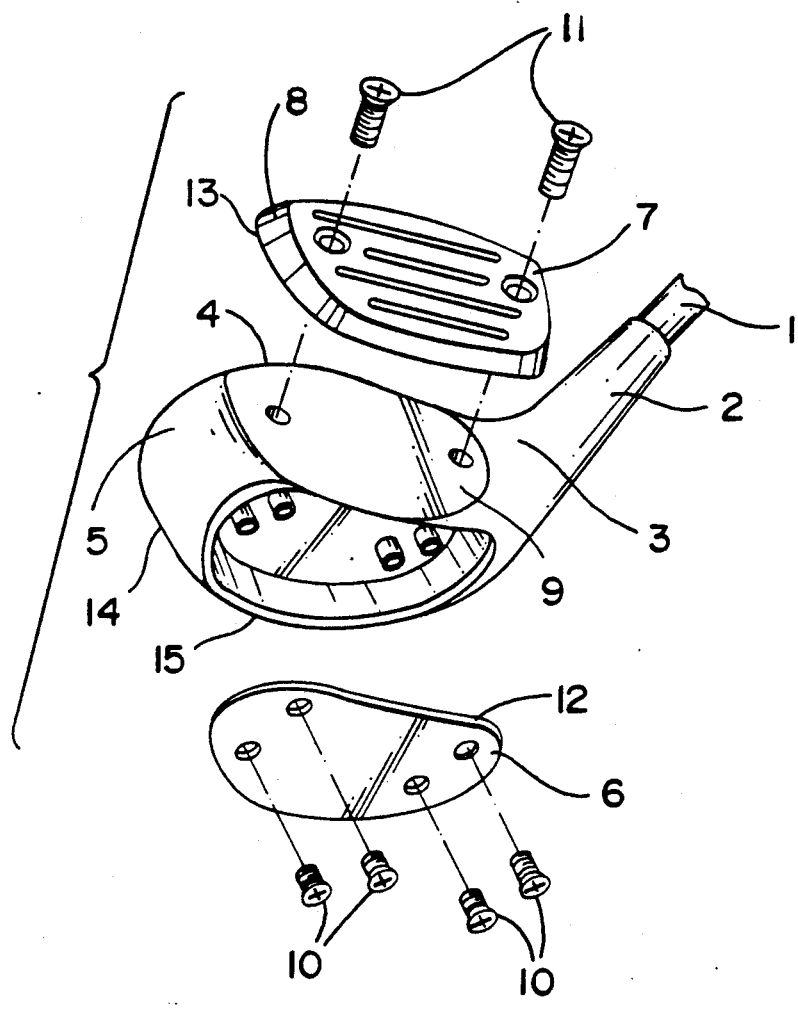
FIG. 4 is a schematic in exploded view of a wood or driver club head.

This invention is related to golf club heads having a component having at least one portion made with at least one composite material (e.g., ceramic matrix composites, metal matrix composites, plastic or polymer matrix composites, etc.) and/or another material (e.g., plastics, metals, ceramics, etc.). Specifically, this invention is related to golf club heads having portion made from at least one composite material and specifically, having a portion made from at least one of a metal matrix composite and a ceramic matrix composite material and more specifically, at least one of a metal matrix composite and a ceramic matrix composite described in the above-identified commonly owned patents and patent applications.

Generally, there are four categories of golf clubs: (1) long distance clubs, such as woods or drivers, and low number irons; (2) intermediate range irons; (3) short range irons; and (4) putters. The properties of composite materials can be optimized for use in golf club heads by the judicious selection of the components of the composite materials, thus, providing advantages over traditional materials, such as: wood, forged carbon steels, investment cast stainless steels, copper based alloys, nickel based alloys, cobalt based alloys, and titanium based alloys. FIG. 1 is a schematic of a wood or driver golf club head. A golf club head body 14 is attached to a shaft 1 by a hosel or shaft receiving member 2. A wood or driver golf club head comprises a hosel or shaft receiving member 2 attached to a heel portion 3, a top portion 4 and a sole or club bottom 6 defining a striking face 7 having a "sweet spot" thereon and converging at a toe portion 5. FIGS. 2 and 3 are schematics of a putter golf club head and an iron golf club head, respectively. An iron golf club head comprises a hosel or shaft receiving member 202 attached to a heel portion 203, a top portion 204 and a sole or club bottom 206 defining a striking face 207 having a "sweet spot" thereon and converging a toe portion 205. A putter golf club head may comprise a hosel or shaft receiving member 102 attached to a top portion 104, disposed between a heel portion 103 and a toe portion 105. Top portion 104, heel portion 103, toe portion 105 and club bottom 106 define the boundaries of a striking face 107. The instant application relates to wood or driver, iron, and putter golf club heads incorporating at least one composite material and specifically, at least one of a metal matrix and ceramic matrix composites and more specifically, at least one of a metal matrix composite and a ceramic matrix composite described in the above-identified commonly owned patents and patent applications.

This invention relates to golf club heads having mass distributions and mechanical properties that provide a moment of inertia to the golf club head so that upon contact with a golf ball the golf club head remains true to its original swing path. Moreover, this invention relates to golf club heads with increased striking surface size and therefore "sweet-spot" size while at least a maintaining a golf club head mass compliant with the U.S. Golf Association Weight Rules.

In a first embodiment of the instant invention, a golf club head is comprised substantially completely of a composite material and specifically, a metal matrix composite or a ceramic matrix composite, and more specifically, a metal matrix composite or a ceramic matrix composite described in the above-identified commonly owned patents and patent applications. Golf club heads comprising a metal matrix composite may be manufactured, for example, by injection molding a molten matrix metal into a cavity having a shape corresponding to a golf club head and containing a filler material. Likewise, a golf club head comprising a metal matrix composites may be formed by hot isostatic pressing of a mixture including a metal powder, metal whiskers, ceramic powder, ceramic whisker or combination thereof. More specifically, golf club heads comprising metal matrix composites might be formed by spontaneously infiltrating or infiltrating with a self-generated vacuum, a molten matrix metal into a loose filler material contained within a mold shaped with an inner cavity shaped to correspond substantially to the outer dimensions of a golf club head or a preform of filler material shaped to correspond substantially to a golf club head and solidifying the resultant body. Likewise, a golf club head comprising a ceramic matrix composite might be formed by the directed oxidation of a parent metal into a loose filler material contained within a mold of barrier material with an inner cavity shaped to correspond substantially to a golf club head or a the preform of filler material shaped to correspond substantially to a golf club head. Additionally, a golf club head comprising a ceramic matrix composite might be formed by reactively infiltrating a parent metal into a loose bed of solid oxidant or a loose bed of a solid oxidant and a filler material contained within a mold with an inner cavity shaped to correspond substantially to the outer dimension of a golf club head or a preform of solid oxidant or solid oxidant/filler material shaped to correspond substantially to the desired golf club head. A golf club head made from the composite materials and specifically, a metal matrix composite or a ceramic matrix composite and more specifically, a metal matrix composite or a ceramic matrix composite described in the above-identified commonly owned patents and patent applications might be larger than their counter parts made of steel when the density of the composite material and specifically, when the density of the metal matrix composite or the ceramic matrix composite and more specifically, the density of metal matrix composite or the ceramic matrix composites described in the above-identified commonly owned patents and patent applications composite is less than that of steel. A direct benefit of using a composite material with a density lower than steel might be the increase of golf club head size and therefore the striking face may be enlarged for a given golf club head while complying with U.S. Golf Association weight rules. A larger "sweet spot" size would follow from a larger striking face size. The mechanical properties of metal matrix composite golf club heads may be tailored by selecting appropriate matrix metals, filler material sizes or filler material size distributions, and filler material composition combinations. Moreover, the mechanical properties of composite materials and specifically, metal matrix composites and ceramic matrix composites and more specifically, metal matrix composite and ceramic matrix composites described in the above-identified commonly owned patents and patent applications may be graded by grading the filler material loading and/or the filler material size distribution and/or the filler material composition. Specific mechanical properties of the composite materials that may be tailored include, for example, stiffness or elastic modulus, wear resistance, toughness, density, and damping capacity. The elastic modulus might be tailored for improved momentum transfers from the golf club head to the golf ball. The density distribution within the golf club head may be tailored such that the inertia of the golf club swing might cause the swing path of the golf club head to remain constant during the contact of the golf club head and the golf ball. The wear resistance of the striking surface may be tailored to ameliorate scuffing resulting from the golf club head impacting not only the golf ball but also other golf clubs, golf course turf, rocks, and sand.

In a second preferred embodiment of the instant invention, golf club heads may be made as macrocomposites comprised of commercially available materials (e.g., metals, plastics, wood, ceramics, polymer matrix composites, metal matrix composites, ceramic matrix composites, platelet reinforced composites, etc.) and at least one composite material metal matrix or ceramic matrix and specifically, at least one of a metal matrix composite and a ceramic matrix composite and more specifically, at least one of a metal matrix composite and a ceramic matrix composite described in the above-identified commonly owned patents and patent applications. Specifically, the second embodiment of the instant application combinds commercially available materials and at least one composite material by a fastening means. Such fastening means include, but are not limited to, screwing, bolting, riveting, resin bonding, soldering, welding, gluing, mechanically interlocking, shrink fitting, etc.

FIG. 4 is a schematic of a wood or driver golf club head, in an exploded view, having a shaft 1 attached to the body 14 of the golf club head at the hosel or shaft receiving member 2. The body 14 of the golf club head includes a hosel 2 attached to a heel 3, a top 4 and sole receiving surface 15 defining an insert member receiving surface 9 and converging at a toe 5. Other components of the golf club head include an insert 8 having a striking surface 7 and a bottom or sole plate 12. Any portion of or any of the body 14, the insert 8, and the sole plate 12 may be made from a commercially available material and at least one portion of the body 14, the insert 8, or the sole plate 12 are made from a composite material (e.g., metal matrix composites, ceramic matrix composite, etc.) and particularly, one of a body 14, an insert 8, and a sole plate 12 might be made of the composite materials (e.g., metal matrix composite, ceramic matrix composite, etc.) described in the above-identified commonly owned patents and patent applications. The components of the golf club head are combined by a fastening means to form a golf club head. FIG. 4 depicts the fastening means for both the insert 8 and the sole plate 12 as screws but this depiction should not be taken as limiting the fastening means to screws. A wood or driver golf club head of this second embodiment might include a body 14 of a metal matrix composite, either commercially available or a metal matrix composite described in the above-identified commonly owned patents and patent applications, an insert 8 of a commercially available ceramic matrix composite or a ceramic matrix composite described in the above-identified commonly owned patents and patent applications, and a sole plate 12 of a ceramic matrix composite or a ceramic matrix composite described in the above-identified commonly owned patents and patent applications combined by a fastening means.

Figure 5:
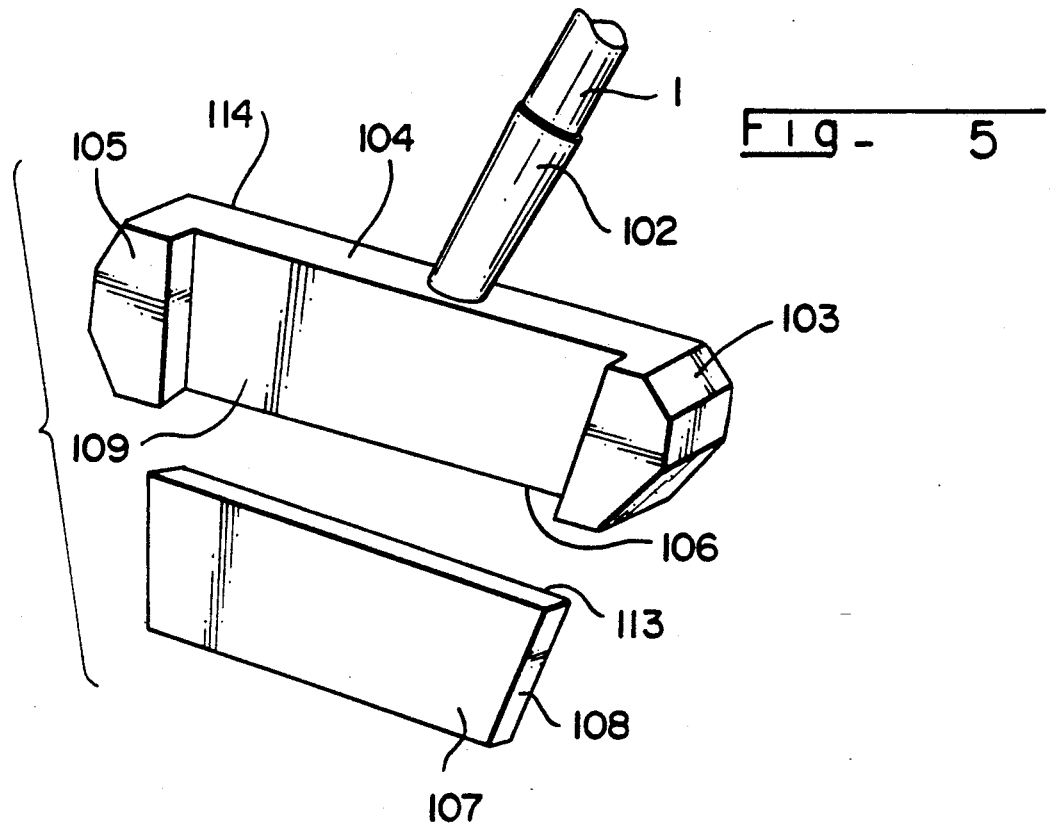
FIG. 5 is a exploded schematic of a putter golf club head.
Figure 6:
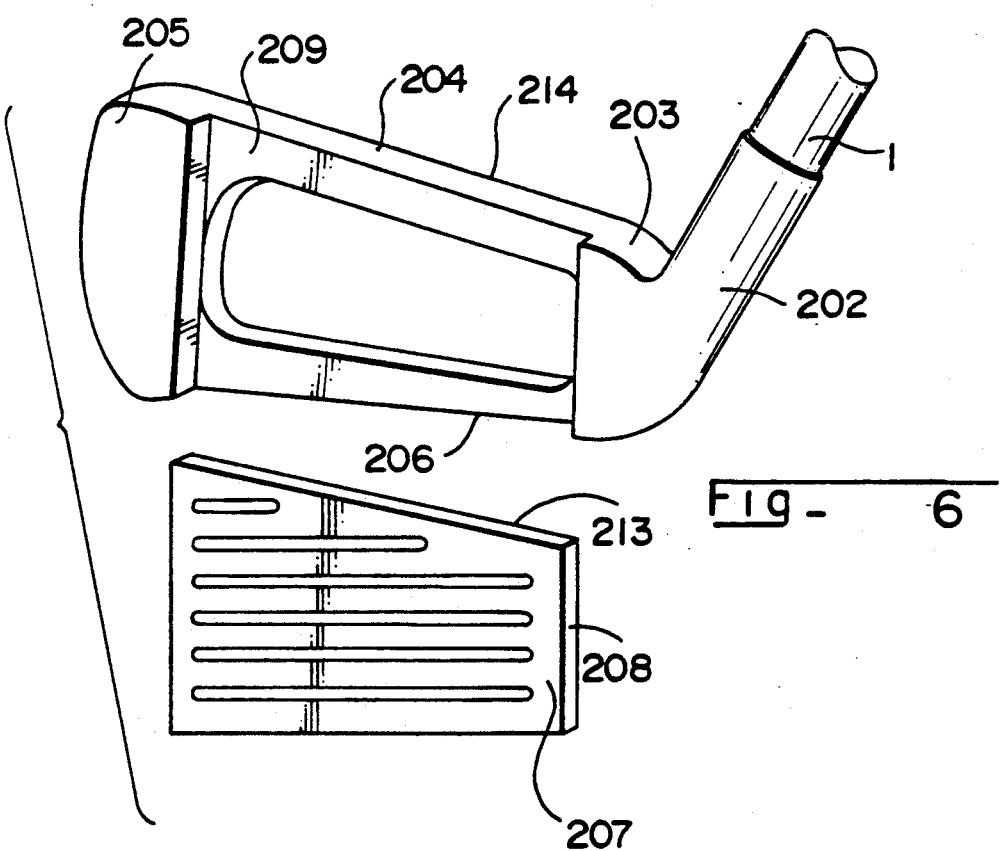
FIG. 6 is a exploded schematic of an iron golf club head.

FIG. 5 is a schematic of a putter golf club head, in an exploded view, having a shaft 1 attached to the body 114 of the golf club head. The golf club head includes a hosel 102, a heel 103, a top 104, a toe 105, an insert receiving surface 109, an insert 108 with a striking surface 107 and an opposite attachment surface 113, and a golf club head bottom 106. Likewise, FIG. 6 is a schematic of an iron golf club head in an exploded view having a shaft 1 attached to the body 214 of the golf club head. The golf club head includes a hosel 202, a heel 203, a top 204, a toe 205, an insert receiving surface 209, and a golf club head bottom 206. A remaining component of the golf club head includes an insert 208 with a striking surface 207 and an opposite attachment surface 213. As with the wood or driver golf club head, any of a body 214 and an insert 208 may be made from either a commercially available material and at least one of a body 214 and an insert 208 are made to incorporate at least one composite (e.g., metal matrix composite, ceramic matrix composite, etc.) and particularly, a composite material described in the above-identified commonly owned patents and patent applications. As with the wood or driver golf club head these components of the putter or iron golf club head are combined by a fastening means to form a golf club head. The mechanical properties of the components of the golf club head may be tailored by selecting appropriate matrix metals or parent metals, filler material sizes or size distributions, and filler material composition combinations. Moreover, the mechanical properties of metal matrix, and ceramic matrix composite golf club head components and particularly, composite materials described in the above-identified commonly owned patents and patent applications may be graded by grading the filler material loading and/or the filler material size distribution and/or the filler material composition. Specific mechanical properties that might be tailored include, for example, stiffness or elastic modulus, wear resistance, density, and damping capacity. The elastic modulus of an insert might be tailored, for example, to improve momentum transfer from the golf club head to the golf ball.

A combination of various golf club head components made from commercially available metal matrix materials, and ceramic matrix materials and particularly, composite materials described in the above-identified commonly owned patents and patent applications would produce golf club heads with improved accuracy, that drive golf balls greater distances, and improved forgiveness of misshots thereby potentially reducing hooking and slicing of the golf ball.

In a third embodiment of the instant invention, a golf club head made from commercially available materials (e.g., plastics, metal, ceramics, ceramic composite, metal matrix composites, plastic matrix composites, etc.) and at least a metal matrix or a ceramic matrix composite and particularly, a composite material described in the above-identified commonly owned patents and patent applications. Specifically, the third embodiment includes making at least one component of the golf club head from a composite material (e.g., metal matrix ceramic matrix, etc.) and in particular, a composite material described in the above-identified commonly owned patents and patent applications. The remaining components of the golf club head might include commercially available materials and/or composite materials and particularly, composite materials described in the above-identified commonly owned patents and patent applications. This embodiment differs from the second embodiment in that the components of the golf club head are combined in situ during the formation of at least one of the materials and/or composite materials. As a first example of this embodiment, an insert 8 comprised of, for example, a ceramic or ceramic composite having a striking surface 7 may be incorporated in a preform of filler material having a shape corresponding to that of a golf club head. The preform incorporating the insert 8 might, for example, then be either spontaneously infiltrated with a matrix metal, infiltrated by a self-generated vacuum with a matrix metal, infiltrated with an oxidation reaction product of the directed oxidation of a parent metal, or reactively infiltrated by a parent metal reacting with a solid oxidant contained in the filler material. During any of these steps, the product, either a metal matrix composite or a ceramic matrix composite, comprising the golf club head body 14, would incorporate and integrally bond to the insert 8 thereby forming a macrocomposite golf club head. As a second example of this embodiment, the insert 8 might be incorporated into the body 14 of the golf club head by incorporating a material with a melting temperature lower than that of the body. An example for this variant of the third embodiment might include forming a metal matrix composite golf club body 14 having a recess with a insert receiving surface 9. A lower melting material (e.g., plastic, polymer matrix composite, low melting metal, etc.) might then be molded into the recess and integrally bonding to the golf club head body. The material combinations of for this third embodiment should not be limited to the above two examples. The mechanical properties of the components of the golf club head may be tailored by selecting appropriate matrix metals or parent metals, filler material sizes or size distributions, and filler material composition. Moreover, the mechanical properties of metal matrix and ceramic matrix composites and particularly, composite materials described in the above-identified commonly owned patents and patent applications golf club head components may be graded by grading the filler material loading and/or selecting a specific filler material size distribution and/or selecting a specific filler material composite. Specific mechanical properties that might be tailored include, for example, stiffness or elastic modulus, wear resistance, density, and damping capacity. The elastic modulus of an insert might be tailored, for example, to improve momentum transfer from the golf club head to the golf ball.

A combination of various golf club head components made from composite materials and in particular, composite materials described in the above-identified commonly owned patents and patent applications and commercially available materials would produce golf club heads with improved accuracy, that would drive golf balls with greater distances, and improved forgiveness of misshots thereby potentially reducing hooking and slicing of the golf ball.

EXAMPLE 1

This Example demonstrates the fabrication of a macrocomposite golf club head comprising a metal matrix composite face piece of reduced reinforcement loading which is bonded using an epoxy adhesive to a commercially available metal golf club head body.

To fabricate a metal matrix composite body having a reduced loading of reinforcement particles, a metal matrix composite body having the normal, typical loading of reinforcement particles was first fabricated. Specifically, about 1,500 grams of a filler material mixture comprising by weight about 3.0% magnesium particulate ($-325$ mesh, Hart Corporation, Tamaqua, Pa.) and the balance 500 grit 39 CRYSTOLON ® green silicon carbide particulate (Norton Company, Worcester, Mass.) having an average particle size of about 17 microns was placed into a porcelain ball mill having a capacity of about 8.3 liters (U.S. Stoneware Corporation, Mahwah, N.J.). About 4,000 grams of alumina based milling media, each having a diameter of about 1.0 inch (25 mm) was placed into the ball mill and the mill was sealed. After ball milling the filler material for about 2 hours, the filler material was poured into a graphite boat having a wall thickness of about ¼ inch (6 mm) to ½ inch (13 mm) and whose interior measured about 6½ inches (165 mm) square by about 4.0 inches (102 mm) deep and had been aerosol spray coated with about four (4) thin coats of AERODAG ® colloidal graphite (Acheson Colloids Company, Port Huron, Mich.) and had been dried at a temperature of about 380° C. in air for about 2 hours.

The graphite boat and its contents were then placed into an air atmosphere drying oven at a temperature of about 225° C. for about 12 hours to thoroughly remove any residual moisture from the ball milled filler material. The graphite boat was then shaken to level the filler material contained within and then tapped gently several times to collapse any unnecessarily large void space within the filler material. A layer of magnesium particulate ($-325$ mesh, Hart Company, Tamaqua, Pa.) was then sprinkled evenly over the top surface of the filler material until a concentration of about 0.1 gram per square inch (16 mg/cm$^2$) had been achieved.

Several ingots of a matrix metal comprising by weight about 12.0% silicon and the balance aluminum and totaling about 2,286 grams in mass were placed into a second graphite boat whose interior measured about 6½ inches (165 mm) square by about 4.0 inches (102 mm) deep and whose wall thickness measured about ¼ (6 mm) to ½ (13 mm) inch thick. This second graphite boat also featured an approximately 2.0 inch (51 mm) diameter hole in the base. The top opening of this second graphite boat was covered loosely with a sheet of GRAFOIL ® graphite foil (Union Carbide Company, Carbon Products Division, Cleveland, Ohio) whose edges were folded down over the sides of the second graphite boat. The second graphite boat and its contents were then placed directly atop the first graphite boat and its contents and both were placed into a retort furnace. About 30 grams of aluminum nitride particulate (Advanced Refractory Technologies, Inc., Buffalo, N.Y.) was placed into a refractory crucible which in turn was placed into the retort furnace along side the stacked graphite boats to help scavenge residual oxygen from the retort atmosphere.

The retort was sealed and the retort atmosphere was then evacuated using a mechanical roughing pump. The retort was then backfilled with nitrogen gas to approximately atmospheric pressure. A nitrogen gas flow rate through the retort of about 15 liters per minute was established and maintained. The furnace was then heated from about room temperature to a temperature of about 225° C. at a rate of about 400° C. per hour. After maintaining a temperature of about 225° C. for about 12 hours, the temperature was then increased to about 525° C., again at a rate of about 400° C. per hour. After maintaining a temperature of about 525° C. for about 1 hour, the temperature was then further increased to about 780° C. again at a rate of about 400° C. per hour. After maintaining a temperature of about 780° C. for about 3 hours, the retort chamber was opened and the stacked graphite boats were removed to reveal that the matrix metal had melted and spilled through the hole in the base of the upper graphite boat onto the filler material in the bottom graphite boat and had pressurelessly infiltrated said filler material to form a metal matrix composite body. The upper graphite boat was removed from the lower graphite boat and the lower graphite boat containing the formed metal matrix composite body was placed onto a chill plate to effect directional solidification of the metal matrix composite body contained within. The exposed surface of the metal matrix composite body was covered with a quantity of FEEDOL ® No. 9 hot topping particulate mixture (Foseco, Inc., Cleveland, Ohio) to assist in maintaining the temperature gradient during directional solidification. Upon cooling to about room temperature, the metal matrix composite body was removed from the graphite boat and was surface cleaned by grit blasting.

Next, the volume fraction of silicon carbide reinforcement in the formed metal matrix composite body was reduced by dilution. Specifically, the dilution was accomplished by melting about 850 grams of a matrix metal comprising by weight about 12.0% silicon, 0.03% strontium, and the balance aluminum in a graphite crucible under an argon gas atmosphere at a temperature of about 750° C. The formed metal matrix composite body described previously was cut into several smaller blocks using a diamond saw. A number of blocks of the previously described metal matrix composite body were placed into a second graphite crucible until a total of about 1,250 grams of metal matrix composite material lay in the crucible. This second graphite crucible and its contents were then heated to a temperature of about 300° C. The preheated metal matrix composite blocks were then added one at a time to the molten matrix metal over a period of about 1½ hours. The matrix metal and the added metal matrix composite blocks were allowed to equilibriate at a temperature of about 750° C. for about ½ hour after the last block had been added to the matrix metal. The equilibrated mixture was then stirred for about 5 minutes at a speed of about 2000 rpm using a Lab Master T51515 Mechanical Stirrer. After this stirring operation, the mixture comprising a molten metal matrix composite of reduced volume fraction of silicon carbide reinforcement was ready to be cast into preheated investment shells.

A refractory investment shell mold defining the insert shape for the golf club head was fabricated as described below.

A commercially available metal golf club head was first spray coated with Grade MS-122 fluorocarbon release agent dry lubricant (Miller-Stevenson, Inc., Danbury, Conn.). GI-1000 rubber molding compound (Plastic Tooling Supply Company, Exton, Pa.) was then cast around the spray coated golf club head to form a first rubber mold inversely replicating the shape of the golf club head. After curing the rubber molding compound in air for about 12 hours, the spray coated golf club head was separated from the first rubber mold. The insert portion of the metal golf club head which was to be replicated with metal matrix composite material was then electro-discharge machined from the as-received metal golf club head to leave behind a cavity in the golf club head of the desired shape. The hollowed-out golf club head was then placed back into the first rubber mold and a polyurethane based polymer material (C-1511 isocyanate urethane casting resin, Smooth-On, Inc., Gillette, N.J.) comprising by weight and about 50 percent catalyst and the balance resin was cast into the cavity of the golf club head within the first rubber mold. After the cast polyurethane material had cured and hardened the contents of the first rubber mold were disassembled to reveal that the cast polyurethane material had formed an accurate positive model of the desired golf club head insert.

A wax spur was attached to the polyurethane golf club insert and a second rubber mold was cast around the insert and the wax spur to form a negative image thereof. The role of the wax spur was to form a gate or riser portion of the subsequently formed investment shell cavity. After curing the rubber molding compound in substantially the same manner as was described earlier, the polyurethane insert and the wax spur were removed from the second rubber mold and a positive image wax pattern of the golf club head insert and its attached gate section was then made by casting Grade 5550-K. GRN. FLK. molten wax (Yates Manufacturing Company, Chicago, Ill.) at a temperature of about 110° C. into the cavity in the second rubber mold. After the wax had cooled to about room temperature the wax model and its attached gate section were then removed from the rubber mold. The wax model of the golf club head insert and the attached gate sections were then attached using molten wax to a styrofoam cup which had been coated with wax to form an investment pattern. The shape of the styrofoam cup would later form the reservoir portion of the investment shell to be cast around the wax model, gate section, and cup.

An investment shell was then built up on the surface of the investment pattern. Specifically, the investment pattern comprising the wax model and its were dipped into a slurry comprising about 29.6% by weight NYACOL ® 1430AT colloidal silica (Nyacol Products, Inc., and affiliate of PQ Corporation, Ashland, Mass.), about 65.1% HUBERCARB ® Q 325 calcium carbonate (−325 mesh, JM Huber Corporation, Calcium Carbonate Division, Quincy, Ill.) having substantially all particles smaller than about 45 microns in diameter, about 4.3% 500 grit (average particle diameter of about 17 microns) 39 CRYSTOLON ® green silicon carbide particulate (Norton Company, Worcester, Mass.), about 0.6% VICTOWET ® 12 wetting agent (Ransom and Randolph, Inc., Maumee, Ohio), and about 0.3% DCH ANTIFOAM ® defoamer (Ransom and Randolph, Inc., Maumee, Ohio). The coated model was then dusted or stuccoed with dry 90 grit RANCO ® SIL No. 4 silica sand (Ransom and Randolph, Inc., Maumee, Ohio). The wax model and its developing investment shell were then dried for about ½ hour at a temperature of about 65° C. The dried investment shell was then dipped for about 2 seconds into a bath of NYACOL ® 1430AT colloidal silica (Nyacol Products, Inc., Ashland, Mass.). This dip-dust-dry-wet sequence was then immediately repeated two more times. Next, the coated investment pattern was immediately dipped into a secondary slurry comprising by weight about 1 part REDIP ® indicator (Ransom and Randolph, Inc., Maumee, Ohio), about 2 parts VICTOWET ® 12 wetting agent (Ransom and Randolph, Inc., Maumee, Ohio), about 56 parts distilled water, and about 274 parts NYACOL ® 830 colloidal silica (Nyacol Products, Inc., Ashland, Mass.), and about 700 parts RANCO ® SIL No. 2 silica powder (Ransom and Randolph, Inc., Maumee, Ohio) to yield a slurry viscosity corresponding to about 15 seconds in a Zahn No. 4 cup. The slurry investment shell was then stuccoed or dipped into a fluidized bed of approximately 30 grit RANCO ® SIL B silica sand (Ransom and Randolph, Inc., Maumee, Ohio). The stuccoed investment shell was again dried at a temperature of about 65° C. for about ½ hour or until the REDIP ® indicator in the shell changed in color from yellow/green to deep orange. This second dip-stucco-dry sequence was then repeated an additional five (5) times. No prewetting of the investment shell with colloidal silica between dippings in the secondary investment shell slurry was required. After application of the third secondary shell layer, the developing shell was wrapped with wire which served as a reinforcement. Several 1/16 inch (1.6 mm) diameter holes were drilled in the investment shell in strategic places to assist in venting gases from the wax during the subsequent autoclaving.

The coated investment pattern was then placed into a steam autoclave to remove the wax from the surrounding investment shell. After autoclaving at a temperature of about 300 F and a pressure of about 100 psi (690 kPa) for about 4 minutes substantially all of the wax had been removed from the surrounding investment shell. The investment shell was then removed from the steam autoclave and placed into a resistance heated air atmosphere furnace at a about room temperature. The furnace was then heated to a temperature of about 900° C. at a rate of about 800° C. per hour. After maintaining a temperature of about 900° C. for about 1 hour, the styrofoam had completely combusted and the investment shell had rigidized. Accordingly, the furnace temperature was decreased to a temperature of about 750° C. The furnace was maintained at this temperature until the rigidized investment shell was ready to be used in the pressureless metal infiltration process.

When the dispersed metal matrix composite mixture described earlier was ready to be cast into the investment shell, the investment shell was removed from the approximately 750° C. air atmosphere furnace, and was placed onto a refractory plate. After the dispersed metal matrix composite mixture had been adequately stirred, the mixture was immediately poured into the investment shell up to the gate section of the investment shell. The gate section of the investment shell corresponds to the region of the shell which at one point housed the wax spur portion of the investment pattern. The remaining volume in the investment shell was filled or topped off with pure molten matrix metal at a temperature of about 750° C. (i.e., matrix metal containing no ceramic reinforcement) comprising by weight about 12.0% silicon, about 0.03% strontium, and the balance aluminum. The investment shell and its contents comprising dispersed metal matrix composite material and unreinforced matrix metal was then placed back into the approximately 750° C. nitrogen atmosphere furnace for about 15 minutes. The investment shell and its contents were then removed from the furnace and directional solidification of the molten matrix metal contained within was commenced. Specifically, air was blown around the base of the investment shell while the exposed surface of the matrix metal was covered with a hot topping particulate mixture (FEEDOL ® No. 9, Foseco, Inc., Cleveland, Ohio) to help maintain the temperature gradient during solidification. After the investment shell and its contents had cooled to about room temperature, the investment shell was removed with light hammer blows to recover the metal matrix composite golf club head insert and its attached gate section and reservoir. The attached gate section and reservoir were removed using a diamond saw and the outside face of the dispersed metal matrix composite insert was lightly diamond machined to restore the corresponding detail of the metal original portion of the golf club head.

The metal matrix composite insert was attached to the original golf club head by means of Dexter Hysol EA9460 epoxy adhesive (Hysol Aerospace and Industrial Products Division, Pittsburg, Calif.). Specifically, the corresponding surfaces to be bonded on the golf club head body and the metal matrix composite insert were first bathed in acetone and then grit blasted for the purposes of cleaning the surfaces to be bonded and roughening the surfaces for improved adhesion. The components of the epoxy were mixed in the proportion recommended by the manufacturer and applied to both the metal matrix composite insert and to the original golf club head. To ensure a uniform bond line and to adequately squeeze the adhesive into the various crevices between the parts to be joined, the joined assembly was held in place with a number of clamps. The epoxy was allowed to set and cure for about three (3) days at room temperature. After curing the epoxy, the clamps were removed and a macrocomposite golf club head comprising a metal matrix composite insert and an unreinforced metal body was recovered.

EXAMPLE 2

A macrocomposite golf club head was fabricated by techniques substantially similar to those described in Example 1 with the exception that the metal matrix composite insert did not feature a reduced volume fraction of silicon carbide reinforcement.

An investment shell was fabricated by substantially the same technique as was described in Example 1. The filler material for the metal matrix composite comprising the magnesium particulate (−325 mesh, Hart Corporation, Tamaqua, Pa.) and the 500 grit 39 CRYSTOLON ® green silicon carbide particulate (Norton Company, Worcester, Mass.) was prepared in substantially the same manner and comprised the same proportions as the filler material described in Example 1. The processed filler material was then poured into the investment shell cavity and the investment shell was tapped lightly on a table top about 4 or 5 times to settle the filler material by collapsing any unusually large voids or air spaces between the filler particles. The total weight of filler material in the investment shell amounted to about 42 grams. About 0.04 grams of 50 mesh magnesium particulate (Hart Corporation, Tamaqua, Pa.) was sprinkled evenly over the top of the filler material. Several ingots of a matrix metal comprising by weight about 12% silicon, about 0.03% strontium, and the balance aluminum were wedged into the reservoir chamber located in the upper portion of the investment shell above the filler material in the lower portion of the investment shell. The quantity of matrix metal amounted to about 367 grams. A sheet of PERMAFOIL ® graphite foil (TTAmerica, Portland, Oreg.) sufficiently large to cover the opening of the investment shell was placed over this opening. The investment shell and its contents was then strapped to a stainless steel holder using strips of copper foil. The stainless steel holder and its contents was then placed into a stainless steel can measuring about 12 inches (305 mm) square and about 14 inches (356 mm) deep having a sheet of PERMAFOIL ® graphite foil (TTAmerica, Portland, Oreg.) covering the floor of the can. About 10 grams of TI-LOY 97 titanium sponge (Chemalloy Company, Bryn Mawr, Pa.) and about 10 grams of magnesium turnings (RMC-3, Reade Manufacturing Company, Lakehurst, N.J.) were placed on the graphite foil on the floor of the stainless steel can to serve as oxygen getters (i.e., to scavenge residual oxygen impurities in the local furnace atmosphere during the metal matrix composite fabrication process). A sheet of copper foil measuring about 16 inches (406 mm) square was then placed over the open end of the stainless steel can and the edges of the copper foil were folded down tightly over the sides of the can to form a chamber in the can in which to create a localized atmosphere for infiltration of matrix metal into the filler material to create a metal matrix composite body.

The stainless steel can and its contents was then placed into a resistance heated air atmosphere furnace at about room temperature. Nitrogen gas was supplied to the interior of the stainless steel can through a purge tube provided through the side of the can. A nitrogen flow rate of about 30 liters per minute was established into the can. The nitrogen gas exited the stainless steel can through the spaces between the sides of the can and the copper foil. The furnace was then heated to a temperature of about 250° C. at a rate of about 400° C. per hour. After maintaining a temperature of about 250° C. for about 2 hours, the temperature was increased to about 540° C. at a rate of about 400° C. per hour. After maintaining a temperature of about 540° C. for about 1 hour, the temperature was then increased to about 780° C. at a rate of about 400° C. per hour. After maintaining a temperature of about 780° C. for about 1½ hours, the furnace was opened, the nitrogen gas purge tube was disconnected, and the stainless steel can and its contents was removed from the furnace and disassembled. The stainless steel holder and its contents was removed from the stainless steel can, the graphite foil cover was removed from the investment shell, and directional solidification of the molten matrix metal contained within was commenced. Specifically, room temperature air was blown around the base of the investment shell while a quantity of FEEDOL ® No. 9 hot topping particulate mixture (Foseco, Inc., Cleveland, Ohio) was sprinkled on top of the exposed surface of molten matrix metal to assist in maintaining the required temperature gradient for directionally solidifying the molten matrix metal contained within the investment shell. The contents of the investment shell were recovered in substantially the same manner as were those described in Example 1 and those contents revealed that the matrix metal had infiltrated the filler material and the investment shell to form a metal matrix composite body. The finishing operations required of the metal matrix composite golf club head insert were substantially the same as those required of the insert described in Example 1. Furthermore, the method used to attach the finished metal matrix composite golf club head insert to the rest of the golf club head was substantially the same as that described in Example 1.

Thus, this Example demonstrates the fabrication of a macrocomposite golf club head comprising a metal matrix composite insert having a reinforcement loading typical for the given raw materials and processing employed.

EXAMPLE 3

This Example demonstrates the fabrication of a macrocomposite golf putter head comprising an unreinforced metal body with a platelet reinforced composite striking face attached thereto.

A platelet reinforced composite tile was fabricated by reactively infiltrating zirconium metal into a filler of boron carbide particulate as described herein.

A Grade ATJ graphite crucible (Union Carbide Company, Carbon Products Division, Cleveland, Ohio) measuring about 6 inches (152 mm) square in its interior by about 4 inches (102 mm) tall was roughened on its inner surfaces with approximately 120 grit silicon carbide abrasive paper. The residual graphite dust was blown out of the crucible using compressed air.

About 1.93 grams of XUS 40303.00 Experimental Binder (Dow Chemical Company, Midland, Mich.) was placed into an approximately 1 liter NALGENE ® plastic jar (Nalge Company, Rochester, N.Y.) along with about 325 grams of isopropyl alcohol. The plastic jar was sealed with tape and the jar and its contents was placed onto an EBERBACH ® paint shaker (Eberbach Corporation, Ann Arbor, Mich.) and shaken for about 1½ hours to completely dissolve the binder into the isopropyl alcohol. The plastic jar and its contents was then removed from the paint shaker, the jar was opened and about 385 grams of 1000 grit TETRABOR ® boron carbide particulate (ESK Engineered Ceramics, New Canaan, Conn.) having an average particle size of about 5 microns was added to the contents of the jar along with about 3 or 4½ inch (13 mm) diameter BURUNDUM ® media balls (U.S. Stoneware Corporation, Mahwah, N.J.). The plastic jar was resealed and the jar and its contents were then placed back onto the EBERBACH ® paint shaker and shaken for about 2 hours to thoroughly mix the boron carbide particulate with the binder solution. The plastic jar and its contents were then removed from the shaker and the slurry of boron carbide and binder solution was sediment cast by pouring the slurry, minus the media balls, into the graphite crucible and allowing the boron carbide particulate to settle out. The graphite crucible and its contents was then placed into an air atmosphere evaporating chamber so as to remove the isopropyl alcohol in a slow and controlled manner. After drying the sediment casting in the evaporating chamber at room temperature for about 16 hours, the isopropyl alcohol had evaporated to the point where none was visible on top of the sediment casting. The door to the evaporating chamber was opened slightly and the evaporating/drying operation continued for about an additional 2 hours. The graphite crucible and its sediment cast preform contained within was removed from the evaporation chamber and placed into a resistance heated air atmosphere drying oven. After further drying at a temperature of about 45° C. for about 1 hour, the graphite crucible and its contents was transferred to a second such drying oven set at a temperature of about 70° C. After drying at a temperature of about 70° C. for about 2 hours, virtually all of the isopropyl alcohol had been removed from the sediment cast boron carbide preform.

The graphite crucible and its contents comprising the sediment cast boron carbide preform was then placed into a vacuum furnace. The vacuum chamber was evacuated to about 30 inches (762 mm) of mercury vacuum using a mechanical roughing pump and then backfilled with argon gas. After repeating this evacuation and backfilling procedure, an argon gas flow rate of about 2 liters per minute through the vacuum chamber was established. The furnace temperature was then increased from about room temperature to a temperature of about 200° C. at a rate of about 100° C. per hour. At a temperature of about 200° C., the temperature was then increased to about 350° C. at a rate of about 20° C. per hour. Upon reaching a temperature of about 350° C., the furnace temperature was then increased to about 670° C. at a rate of about 64° C. per hour. Upon reaching a temperature of about 670° C., the furnace temperature was then decreased at a rate of about 80° C. per hour. After cooling at this rate to about room temperature, the furnace was opened and the graphite crucible and its contents was removed. The sediment cast boron carbide preform contained within the graphite crucible was found to have a mass of about 381 grams and dimensions of about 5.98 inches (152 mm) square by about 0.49 inch (12 mm) thick. A green density of about 1.34 grams per cubic centimeter or about 53 percent of the theoretical density of boron carbide was thereby computed. The change in mass upon firing in an argon atmosphere to a temperature of about 670° C. indicated that the binder had been removed by this operation.

About 2,340 grams of nuclear grade zirconium sponge (Western Zirconium, Ogden, Utah) was poured into the graphite crucible on top of the sediment cast boron carbide preform and levelled to form a lay-up. The lay-up was placed into the vacuum chamber of a vacuum furnace. The vacuum chamber was evacuated to about 30 inches (762 mm) of mercury vacuum using a mechanical roughing pump and then backfilled with argon gas. The vacuum chamber was then pumped out again using the roughing pump. After achieving about 30 inches (762 mm) of mercury vacuum again, a high vacuum source was connected to the vacuum chamber and the chamber was evacuated further to a final working pressure of about $2 \times 10^{-4}$ mm/tg. The furnace temperature was then increased from about room temperature to a temperature of about 1950° C. at a rate of about 160° C. per hour. Upon reaching a temperature of about 1000° C., the high vacuum source was isolated from the vacuum chamber and the chamber was again backfilled with argon gas. An argon gas flow rate of about 2 liters per minute through the chamber at an overpressure of about 2 pounds per square inch (14 kPa) was established. After maintaining a temperature of about 1950° C. for about 2 hours, the furnace temperature was decreased to a temperature of about 1400° C. at a rate of about 92° C. per hour. Upon reaching a temperature of about 1400° C., the furnace temperature was then further decreased at a rate of about 274° C. per hour. When the furnace had reached about room temperature, the lay-up was removed from the furnace. The contents of the graphite crucible were removed from the crucible to reveal that the zirconium metal had permeated and reacted with the sediment cast boron carbide preform to produce a platelet reinforced composite tile comprising zirconium diboride, zirconium carbide and some residual metal. Quantitative image analysis of similarly produced platelet reinforced composite tiles revealed that the quantity of residual metal amounted to about 22 volume percent.

A piece of platelet reinforced composite material was electro-discharge machined from the platelet reinforced composite tile described above such that the machined piece had a profile corresponding to the striking face of a commercially available metal golf putter body and measured about 1/16 of an inch (1.6 mm) thick.

The golf putter striking face was contoured and then ground down by about 1/16 of an inch (1.6 mm) to accommodate the substitute platelet reinforced composite striking face. Two (2) pockets, each about 10 mils (0.25 mm) deep were machined out of the newly exposed surface of the remaining metal golf putter body to serve as a reservoir for the epoxy adhesive.

The electro-discharge machined platelet reinforced composite golf putter striking face was then ground to conform to the original contour of the original metal striking face of the metal golf putter. The ground striking face of the platelet reinforced composite piece was then metallographically polished.

The corresponding surfaces of the platelet reinforced composite face piece and the original unreinforced metal golf putter body to be joined were then prepared for epoxy bonding in the same manner as were the pieces to be joined in Examples 1 and 2.

The epoxy bonding of the platelet reinforced composite golf putter face piece and the remaining metal golf putter body was carried out in substantially the same manner as the bonding described in Examples 1 and 2.

The resulting macrocomposite golf putter head thus comprised the original metal golf putter body with a 1/16 inch (1.6 mm) thick platelet reinforced composite striking face piece attached thereto.

What is claimed is:

1. A golf club comprising: a golf club shaft and a golf club head attached to said golf club shaft, said golf club head comprising a striking surface having a central portion and outer portions, wherein at least a portion of said striking surface comprises at least one matrix material and at least one filler material which forms at least one composite material, said matrix material comprising at least one material selected from the group consisting of a metal and a ceramic, wherein said at least one composite material comprising said striking surface has at least one property which is graded, at least partially, along said striking surface.

2. The golf club head of claim 1, wherein said at least one property which is graded is achieved by adjusting an amount or loading of said at least one filler material, such that different amounts of filler material are located at different portions along said striking surface.

3. The golf club head of claim 1, wherein said at least one property which is graded is achieved by adjusting at least one size distribution of said at least one filler material, such that different amounts of filler material having different sizes are located at different portions along said striking surface.

4. The golf club head of claim 1, wherein said at least one property which is graded is achieved by adjusting at least one composition of said at least one filler material, such that different amounts of filler material having different compositions are located at different portions along said striking surface.

5. The golf club head of claim 1, wherein said at least one graded property is achieved by at least two steps selected from the following group of steps consisting of (1) adjusting an amount or loading of said at least one filler material such that different amounts or loadings of filler material are located along different portions of said striking surface; (2) selecting at least two size distributions of said filler material such that different size distributions of filler material are located along different portions of said striking surface; and (3) selecting at least two compositions of said filler material such that different compositions of filler material are located along different portions of said striking surface.

6. The golf club head of claim 1, wherein said golf club head is comprised substantially completely of said at least one composite material.

7. A golf club comprising: a golf club shaft and a golf club head attached to said golf club shaft, said golf club head comprising a body having an insert receiving surface; and an insert attached to said insert receiving surface of said body by a fastening means for fastening said body to said insert receiving surface of said body, said insert comprising a striking surface having a central portion and outer portions, wherein at least a portion of said striking surface comprises at least one matrix material and at least one filler material which form at least one composite material, said matrix material comprising at least one material selected from the group consisting of a metal and a ceramic, wherein said at least one composite material comprising said striking surface has at least one property which is graded, at least partially, along said striking surface.

8. The golf club head of claim 7, wherein said at least one graded property of said insert is achieved by adjusting an amount or loading of said at least one filler material, such that different amounts of filler material are located at different portions along said striking surface.

9. The golf club head of claim 7, wherein aid at leas tone graded property of said insert is achieved by adjusting at least one size distribution of said at least one filler material, such that different amounts of filler material having different sizes are located at different portions along said striking surface.

10. The golf club head of claim 7, wherein said at least one graded property of said insert is achieved by adjusting at least one composition of said at least one filler material, such that different amounts of filler material having different compositions are located at different portions along said striking surface.

11. The golf club head of claim 7, wherein said at least one graded property of said insert is achieved by at least two steps selected from the following group of steps consisting of (1) adjusting an amount or loading of said at least on e filler material such that different amounts or loadings of filler material are located along different portions of said striking surface; (2) selecting at least two size distributions of said filler material such that different size distributions of filler material are located along different portions of said striking surface; and (3) selecting at least two compositions of said filler material such that different compositions of filler material are located along different portions of said striking surface.

12. The golf club head of claim 7, wherein said insert is comprised substantially completely of said at least one composite material.

13. The golf club head of claim 7, wherein said fastening means comprises at least one fastening means selected from the group consisting of screwing, bolting, riveting, resin bonding, soldering, welding, glueing, mechanically interlocking and shrink fitting.

14. The golf club head of claim 7, wherein said body comprises at least one material different from said at least one composite material.

15. The golf club head of claim 14, wherein said body comprises at least one material selected from the group consisting of a metal matrix composite, a plastic matrix composite, a glass matrix composite, a carbon-carbon composite, a ceramic matrix composite, a metal, a polymer or plastic, and a ceramic.

16. The golf club head of claim 7, wherein said body and said insert comprise substantially the same material.

17. The golf club head of claim 15, wherein said body comprises a material having at least one property which is graded.

18. The golf club head of claim 1, wherein said at least one property which is graded at least partially along said striking surface is graded in a manner which results in the grading being substantially parallel to said striking surface.

19. the golf club head of claim 18, wherein a greater amount of filler is located in said central portion of said striking surface relative to said outer portions of said striking surface.

20. The golf club head of claim 18, wherein a greater amount of filler is located in said outer portions of said striking surface relative to said central portion of said striking surface.

21. The golf club head of claim 7, wherein said at least one property which is graded at least partially along said striking surface is graded in a manner which results in the grading being substantially parallel to said striking surface.

22. The golf club head of claim 21, wherein a greater amount of filler is located in said central portion of said striking surface relative to said outer portions of said striking surface.

23. The golf club head of claim 21, wherein a greater amount of filler is located in said outer portions of said striking surface relative to said central portion of said striking surface.

24. The golf club head of claim 1, wherein said at least one property which is graded comprises a property selected from the group consisting of stiffness or elastic modulus, wear resistance, toughness, density, hardness, ball gripping and scuffing resistance.

25. The golf club head of claim 7, wherein said at least one property which is graded comprises a property selected from the group consisting of stiffness or elastic modulus, wear resistance, toughness, density, hardness, ball gripping and scuffing resistance.

26. The golf club head of claim 17, wherein said at least one property which is graded comprises a property selected from the group consisting of stiffness or elastic modulus, wear resistance, toughness, density, hardness, ball gripping and scuffing resistance.

27. The golf club head of claim 1, wherein said at least one property which is graded is achieved by adjusting a composition of said matrix, such that matrices having different composition are located at different portions along said striking surface.

28. The golf club head of claim 7, wherein said at least one property which is graded is achieved by adjusting a composition of said matrix, such that matrices having different compositions are located at different portions along said striking surface.

29. The golf club head of claim 17, wherein said at least one property which is graded is achieved by adjusting a composition of said matrix, such that matrices having different composition are located at different portions along said body.

* * * * *